(12) United States Patent
Ellis et al.

(10) Patent No.: US 7,353,192 B1
(45) Date of Patent: Apr. 1, 2008

(54) PRODUCT CONFIGURATION DISPLAY SYSTEM AND METHOD WITH USER REQUESTED PHYSICAL PRODUCT ALTERATIONS

(75) Inventors: Peter R. Ellis, Corona Del Mar, CA (US); Douglas S. Nottage, Irvine, CA (US); Dylan Bromby, Foothill Ranch, CA (US)

(73) Assignee: Autobytel Inc., Irvine, CA (US)

( * ) Notice: Subject to any disclaimer, the term of this patent is extended or adjusted under 35 U.S.C. 154(b) by 0 days.

(21) Appl. No.: 09/251,218

(22) Filed: Feb. 16, 1999

(51) Int. Cl.
*G06Q 99/00* (2006.01)

(52) U.S. Cl. .............................. 705/27; 705/1; 705/71; 715/765

(58) Field of Classification Search .................. 705/26, 705/27, 1, 71; 715/765
See application file for complete search history.

(56) References Cited

U.S. PATENT DOCUMENTS

| | | | |
|---|---|---|---|
| 5,283,731 A | 2/1994 | Lalonde et al. | |
| 5,592,375 A | 1/1997 | Salmon et al. | |
| 5,671,279 A | 9/1997 | Elgamal | |
| 5,682,506 A * | 10/1997 | Corby, Jr. et al. | |
| 5,687,737 A * | 11/1997 | Branham et al. | ........... 128/710 |
| 5,710,887 A | 1/1998 | Chelliah et al. | |
| 5,842,178 A | 11/1998 | Giovannoli | |
| 6,026,376 A * | 2/2000 | Kenney | |
| 6,157,735 A * | 12/2000 | Holub | ......................... 382/167 |
| 6,249,291 B1 | 6/2001 | Popp et al. | |
| 2004/0113945 A1* | 6/2004 | Park et al. | .................. 345/765 |

FOREIGN PATENT DOCUMENTS

JP          410097648 A  *  4/1998

OTHER PUBLICATIONS

Foley et al., "Introduction to Computer Graphics", Published by Addison-Wesley Publishing Company, Inc. , ISBN 0-201-60921-5, 1993.*

(Continued)

*Primary Examiner*—Pierre Eddy Elisca
(74) *Attorney, Agent, or Firm*—Knobbe, Martens, Olson & Bear LLP

(57) ABSTRACT

A product configuration display system and method enabling the configuration and displaying of a product for purchase by a potential buyer. A product configuration display system comprises a data center having a microprocessor operably connected to a storage media. The data center is configured to be networked with at least a buyer terminal, and to receive at least one request to change a product presentation from the buyer terminal. The product configuration display system also includes at least one three-dimensional digital representation or model of a product. The three-dimensional representation of the product is stored in the storage media and is capable of illustrating multiple perspective views of the product by rotating. The product configuration display system further includes a product display module that is operably connected to the storage media. The product display module is configured to execute in the data center, and includes a definition of a product display screen that is accessible by the buyer terminal. The product display module is further configured to receive a request to change a product presentation through the product display screen. The product display module is additionally configured to display the changed product presentation in the product display screen. Changes such as color and texture can be made quickly because the same basic digitized model is used for multiple colors and textures.

39 Claims, 15 Drawing Sheets

OTHER PUBLICATIONS

Burke, R., "Do You See What I See? The Future of Virtual Shopping", Journal of the Academy of Marketing Science, v25n4, pp. 352-360, 1997.*

Hoffman et al., "Marketing in Hypermedia Computer-Mediated Environments: Conceptual Foundations", Journal of Marketing v60n3, pp. 50-68, Jul. 1996.*

PR Newswire, "Over 50 Internet Leaders Embrace Moving World as Next -Generation Open Internet Standard for 3D on the Web", PR Newswire, p0212sjm010, Feb. 1996.*

Gottschalk et al. "Engineers Mine the Online World", Design News, V. 52, Issue 10, pp. 48-56, May 1997.*

Mills et al., "Manufacturing Goes Virtual", Computer-Aided Engineering, V. 17, Issue 12, pp. 30-37, Dec. 1998.*

Rosen, M., "Data Visualization in Three Dimensions", Ent, V. 3, Issue 20, pp. 44+, Dec. 1998.*

Hurrion, R., "Using 3D animation technique to help with the experimental design analysis phase of a visual interactive simulation project", The Journal of the Operational Research Society, V. 44, Issue 7, 1993.*

BMW website for motorcycle, no date.*

Mitchener, B. "Mercedes Dealers Offer New Kind of Test Drive", Wallstreet Journal, Mar. 1998.*

Northern Light Website, Northern Light Search:bmw 850, May 1997.*

The Gale group, Promise and Peril in the Networked Age, Dec. 4, 1995.*

The Showroom, © Copyright 1999 Volvo Cars of North America, Inc., http://www.volvocars.com/home/index.htm2, Apr. 26, 1999.

Microsoft CarPoint—This Week, © 1999 Microsoft Corporation, http://carpoint.msn.com/thisweek, Apr. 26, 1999.

CarPoint's suround video of the week—Lexus RX 300, http://carpoint.msn.com/gallery/thisweeksv, Apr. 26, 1999.

* cited by examiner

PRODUCT CONFIGURATION DISPLAY SYSTEM AND METHOD WITH USER REQUESTED PHYSICAL PRODUCT ALTERATIONS

RELATED APPLICATIONS

The present application is related to the co-pending and commonly owned U.S. patent applications having the following titles and attorney docket numbers, each of which was filed on Jan. 14, 1999:
1. COMPUTER IMPLEMENTED PURCHASING SYSTEM WITH AVAILABLE INVENTORY MANAGEMENT FUNCTIONS, Ser. No. 09/232,188
2. SYSTEM AND METHOD FOR SELECTIVELY RETRIEVING INFORMATION ITEMS, Ser. No. 09/231,521
3. COMPUTER IMPLEMENTED PURCHASING SYSTEM WITH AFTERMARKET PRODUCT INVENTORY DISPLAY, Ser. No. 09/231,898
4. COMPUTER IMPLEMENTED PURCHASING SYSTEM WITH USER ACCESSIBLE PURCHASE REQUEST STATUS, Ser. No. 09/231,525
5. REAL TIME VEHICLE PURCHASE REQUEST MANAGEMENT METHOD AND SYSTEM, Ser. No. 09/231,415
6. REAL TIME COMMUNICATION OF PURCHASE REQUESTS, Ser. No. 09/231,409

Each of the above referenced patent applications are incorporated by reference herein in their entireties.

BACKGROUND

1. Field

The present invention relates to the field of electronic commerce. More particularly, the invention relates to a system and method for permitting a purchaser to view a product over a network before making a purchase decision.

2. Description of the Related Art

Electronic commerce, fueled by the proliferation of the Internet and the World Wide Web, has emerged as a viable means of offering consumer products for purchase. For example, numerous vehicle dealerships provide web sites which a potential purchaser can access to obtain dealer and product information. The purchaser is able to view representative vehicle photographs. But, the conventional web site is unlikely to have available a photograph of every vehicle configuration. Likewise, the conventional web site does not contain photographs of every product configuration. Thus, conventional electronic commerce systems currently facilitate a pay-before-you-see sales environment because the purchaser generally is encouraged to make a purchasing decision before having viewed the desired product configuration.

Having made a purchasing decision, the purchaser next visits a dealership offering the desired vehicle make for sale. The conventional dealership generally maintains a limited number of vehicles in its inventory. The inventory does not include every configuration of every offered vehicle. For example, the dealer may not physically have a vehicle in every available color for the purchaser to view before making a purchasing decision. If the dealer does not have the vehicle in the color desired by the purchaser, the dealer may be able to present the purchaser with a brochure illustrating the vehicle in the desired color. Otherwise, the purchaser may have to finalize the purchasing decision without viewing the vehicle in the desired color or the purchaser may try to find another dealership which has the desired vehicle in the desired color. Thus, if the desired vehicle configuration is not currently in the dealer's inventory, the purchaser experiences frustration and the possibility of finalizing the purchasing decision without viewing the exact product.

Furthermore, the conventional dealership generally offers a variety of dealer vehicle options or aftermarket products for purchase. The potential purchaser can view the vehicle option or aftermarket product. In rare circumstances, the purchaser may be fortunate to view a vehicle which has the desired option or aftermarket product installed in or on the vehicle. Generally though, the purchaser is unlikely to find the exact vehicle configuration, the desired vehicle with the exact options and aftermarket products installed, to view before making the purchasing decision. If the purchaser wants to see how the vehicle would look with the option or aftermarket product installed, the purchaser would likely be limited to viewing a photograph in a product brochure. Again, the purchaser may well have to finalize the purchasing decision before viewing the actual item being purchased.

Certain internet web sites offer purchasers the opportunity to compare various products. For example, a potential purchaser can obtain an illustrative photograph and product description regarding a specific vehicle. The purchaser is able to obtain this type of information for various makes and models of vehicles. Once the information is gathered, the purchaser is able to perform a comparison of the vehicles by noting differences and similarities in the various photographs and product descriptions. Having selected a specific vehicle, the purchaser may then visit the dealership in the hopes of actually viewing the various vehicle configurations being considered by the purchaser. Because the dealership is unlikely to have all the different configurations of the vehicles considered, the purchaser is unlikely to be able to perform an actual side-by-side comparison. Here again, the purchaser will have to make a pay-before-you-see purchasing decision.

Thus, current electronic commerce systems, as well as conventional dealerships, fail to provide potential purchasers an environment in which the purchaser can make adequately informed purchasing decisions. The purchaser is frustrated because the purchasing decision often occurs before having an opportunity to view the desired product configuration. Conversely, there is added cost to the dealership because of the attention needed to accommodate the purchaser's request to see various configurations of vehicles and the need to maintain increased product inventories in hopes of reducing purchaser frustration.

SUMMARY

In one embodiment, a product configuration display system comprises: (1) a data center having a microprocessor operably connected to a storage media, the data center configured to be networked with at least a buyer terminal, the data center configured to receive at least one request to change a product presentation from the buyer terminal; (2) at least one three-dimensional representation of a first product stored in the storage media, the at least one representation of the first product capable of illustrating multiple perspective views if the first product by rotating the three-dimensional representation of the product; and (3) a product display module operably connected to the storage media and configured to execute in the data center, the product display module including a definition of a product display screen accessible by the buyer terminal, the product display module configured to receive a request to change a product presentation through the product display screen, the product viewer module configured to display the changed product presentation in the product display screen by modifying the definition of the product display screen. In one aspect of the embodiment, the at least one three-dimensional representation of the first product is a three-dimensional model of the first product. In another aspect of the embodiment, the at least one three-dimensional representation of the first product is a three-dimensional photograph of the first product. In yet another aspect of the embodiment, the definition of the product display screen includes a manufacturer suggested retail price and an adjusted price. In a further aspect of the embodiment, the rotating includes rotating about a first axis then rotating about a second axis. In yet a further aspect of the embodiment, the first axis is substantially a horizontal axis and the second axis is substantially a vertical axis. In still a further aspect of the embodiment, the first axis is substantially a vertical axis and the second axis is substantially a horizontal axis. In one aspect of the embodiment, the rotating is continuous. In another aspect of the embodiment, the rotating is about a point within the interior of the three-dimensional representation of the product. In still another aspect of the embodiment, the rotating is about a point on the exterior of the three-dimensional representation of the product. In yet another aspect of the invention, the three-dimensional representation can be rotated to illustrate a constant source of light. In a further aspect of the embodiment, the request to change the product presentation includes a request to change the product perspective view. In still a further aspect of the embodiment, the request to change the product perspective view includes changing a reference angle. In yet a further aspect of the embodiment, the request to change the product perspective view includes changing the rotation to a different direction. In one aspect of the embodiment, the request to change the product presentation includes a request to change a product configuration. In another aspect of the embodiment, the request to change the product presentation includes a request to change a product color. In yet another aspect of the embodiment, the request to change the product presentation includes a request to change a color of a product exterior. In a further aspect of the embodiment, the request to change the product presentation includes a request to change a color of a product interior. In one aspect of the embodiment, the rotating includes rotating a carousel.

In another embodiment, a product configuration display system comprises: (1) at least one three-dimensional representation of a first product and at least one representation of a second product, the at least one representation of a first product capable of being modified by at least one representation of the second product to create a three-dimensional representation of a combination product, the representation of the combination product capable of illustrating multiple perspective views of the combination product by rotating the three-dimensional representation of the combination product; and (2) a product display module including a definition of a product display screen accessible by a buyer terminal, the product display module configured to receive a request to change a product configuration through the product display screen wherein the request to change includes modifying the at least one representation of the first product by the at least one representation of the second product, the product display module configured to display the changed product configuration in the product display screen by modifying the definition of the product display screen. In one aspect of the embodiment, the first product is a vehicle and the second product is an aftermarket product. In another aspect of the embodiment, the first product is a vehicle including at least one aftermarket product and the second product is an aftermarket product. In still another aspect of the embodiment, the definition of the product display screen includes a manufacturer suggested retail price and an adjusted price. In yet another aspect of the embodiment, the modifying includes combining the at least one representation of the second product with the at least one representation of the first product. In a further aspect of the embodiment, the modifying includes removing substantially the at least one representation of the second product from the at least one representation of the first product. In still a further aspect of the embodiment, the modifying includes replacing substantially the second product contained within the at least one representation of the first product with the at least one representation of the second product. In yet a further aspect of the embodiment, the request to change includes superimposing the at least one representation of the first product and the at least one representation of the second product. In one aspect of the embodiment, the first product is a sub-product and the second product is a sub-product substantially similar to the first product. In another aspect of the embodiment, the request to change the product configuration includes a request to change a product color. In still another aspect of the embodiment, the request to change the product configuration includes a request to change a product perspective view of the combination product. In yet another aspect of the embodiment, the request to change the product perspective view includes changing a reference angle. In a further aspect of the embodiment, the request to change the product perspective view includes changing the rotating to a different direction.

In still another embodiment, a product configuration display system comprises: (1) at least one three-dimensional representation of a first product, the three-dimensional representation comprised of at least one three-dimensional representation of a sub-product of the first product, the at least one representation of the first product capable of illustrating multiple perspective views of the first product by rotating the three-dimensional representation of the product; and (2) at least one three-dimensional representation of a second product, the at least one three-dimensional representation of the second product modifying the at least one representation of the first product. In one aspect of the embodiment, the three-dimensional representation is a three-dimensional model. In another aspect of the embodiment, the modifying includes combing the at least one representation of the second product with the at least one representation of the first product, whereby the at least one representation of the second product becomes one of the three-dimensional representation of the sub-product which comprises the at least one representation of the first product. In still another aspect of the embodiment, the modifying includes removing the at least one representation of the sub-product which is substantially identical to the at least one representation of the second product. In yet another aspect of the embodiment, the modifying includes replacing the at least one representation of the sub-product substantially similar to the at least one representation of the second product with the at least one representation of the second product. In a further aspect of the embodiment, the modifying includes superimposing the at least one representation of the first product and the at least one representation of the second product. In still a further aspect of the embodiment, the first product is a sub-product and the second product is a sub-product substantially similar to the first product.

In yet another embodiment, a product configuration display system comprises: (1) a data center having a microprocessor operably connected to a storage media, the data center configured to be networked with at least a buyer terminal, the data center configured to receive at least one request to change a product presentation from the buyer terminal; (2) a plurality of buyer terminals located remotely from the data center and remote from one another, the buyer terminals operably connected with the data center; (3) at least one three-dimensional representation of a first product stored in the storage media, the at least one representation of the first product capable of illustrating multiple perspective views of the first product by rotating the three-dimensional representation of the product; and (4) a product display module operably connected to the storage media and configured to execute in the data center, the product display module including a definition of a product display screen accessible by the buyer terminal, the product display module configured to receive a request to change a product presentation through the product display screen, the product display module configured to display the changed product presentation in the product display screen by modifying the definition of the product display screen.

In a further embodiment, a method of presenting at least one product configuration over a network, comprises the acts of: (1) providing a data center having a microprocessor operably connected to a storage media, the data center configured to be networked with at least a buyer terminal, the data center configured to receive at least one request to change a product presentation from the buyer terminal; (2) providing at least one three-dimensional representation of a first product stored in the storage media, the at least one representation of the first product capable of illustrating multiple perspective views of the first product by rotating the three-dimensional representation of the product; (3) providing a definition of a product display screen accessible by a buyer terminal, the definition of the product display screen includes a product presentation, wherein the product presentation includes at least one perspective view of the first product; (4) receiving a request to change the product presentation from a buyer terminal; and (5) modifying the definition of the product display screen according to the request to change the product presentation. In one aspect of the embodiment, the at least one three-dimensional representation of the first product is a three-dimensional model of the first product. In another aspect of the embodiment, the at least one three-dimensional representation of the first product is at least one three-dimensional photograph of the first product. In still another aspect of the embodiment, the definition of the product display screen includes a manufacturer suggested retail price and an adjusted price. In yet another aspect of the embodiment, the rotating includes rotating about a first axis then rotating about a second axis. In a further aspect of the embodiment, the first axis is a substantially horizontal axis and the second axis is a substantially vertical axis. In a still further aspect of the embodiment, the first axis is a substantially vertical axis and the second axis is a substantially horizontal axis. In yet a further aspect of the embodiment, the rotating is continuous. In one aspect of the embodiment, the rotating is about a point within the interior of the three-dimensional representation of the product. In another aspect of the embodiment, the rotating is about a point on the exterior of the three-dimensional representation of the product. In still another aspect of the embodiment, the three-dimensional representation can be rotated to illustrate a constant source of light. In yet another aspect of the embodiment, the request to change the product presentation includes a request to change a product perspective view. In a further aspect of the embodiment, the request to change the product perspective view includes changing a reference angle. In still a further aspect of the embodiment, the request to change the product perspective view includes changing the rotating to a different direction. In yet a further aspect of the embodiment, the request to change the product presentation includes a request to change a product configuration. In one aspect of the embodiment, the request to change the product presentation includes a request to change a product color. Another aspect of the product configuration display system further comprises the acts of: (1) providing at least one three-dimensional representation of a second product stored in the storage media; and (2) receiving a request to change the product presentation by combining the at least one representation of the second product with the at least one representation of the first product. A further aspect of the product configuration display system further comprises the acts of: (1) providing at least one three-dimensional representation of a second product stored in the storage media; and (2) receiving a request to change the product presentation by removing substantially the at least one representation of the second product from the at least one representation of the first product. A still further aspect of the product configuration display system further comprises the acts of: (1) providing at least one three-dimensional representation of a second product stored in the storage media; and (2) receiving a request to change the product presentation by replacing substantially the second product contained within the at least one representation of the first product with the at least one representation of the second product. A yet further aspect of the product configuration display system further comprises the acts of: (1) providing at least one three-dimensional representation of a second product stored in the storage media; and (2) receiving a request to change the product presentation by superimposing the at least one representation of the first product and the at least one representation of the second product.

In still a further embodiment, a method of presenting at least one product configuration, comprises the acts of: (1) providing at least one three-dimensional representation of a first product, the three-dimensional representation comprised of at least one three-dimensional representation of a sub-product of the first product, the at least one representation of the first product capable of illustrating multiple perspective views of the first product by rotating the three-dimensional representation of the product; and (2) providing at least one three-dimensional representation of a second product, the at least one representation of the second product modifying the at least one representation of the first product. In one aspect of the embodiment, the three-dimensional representation is a three-dimensional model. In another aspect of the embodiment, the modifying includes combining the at least one representation of the second product with the at least one representation of the first product, whereby the at least one representation of the second product becomes one of the three-dimensional representation of the sub-product which comprises the at least one representation of the first product. In still another aspect of the embodiment, the modifying includes removing the at least one representation of the sub-product from the at least one representation of the first product which is substantially identical to the at least one representation of the second product. In yet another aspect of the embodiment, the modifying includes replacing the at least one representation of the sub-product substantially similar to the at least one representation of the second product with the at least one representation of the second product. In a further aspect of the embodiment, the modifying includes superimposing the at least one representation of the first product and the at least one representation of the second product. In still a further aspect of the embodiment, the first product is a sub-product and the second product is a sub-product substantially similar to the first product.

In one embodiment, a method of presenting a product configuration over a network, comprises the acts of: (1) providing a data center; (2) providing a network connection between the data center and a buyer terminal; (3) providing at least one three-dimensional representation of a product capable of illustrating multiple perspective views of the product by rotating the three-dimensional representation of the product; (4) transmitting a definition of a product display screen from the data center to the buyer terminal, the product display screen includes a product presentation; (5) receiving a request to change the product presentation; and (6) modifying the definition of the product display screen according to the request to change the product presentation.

In another embodiment, a product configuration viewer apparatus comprises: (1) means for providing at least one three-dimensional representation of a product capable of illustrating multiple perspective views of the product by rotating the three-dimensional representation of the product; (2) means for transmitting a definition of a product display screen to a buyer terminal, the product display screen includes a product presentation; (3) means for receiving a request to change the product presentation; and (4) means for modifying the definition of the product display screen according to the request to change the product presentation.

BRIEF DESCRIPTION OF THE DRAWINGS

These and other aspects, advantages, and novel features of the invention will become apparent upon reading the following detailed description and upon reference to accompanying drawings in which.

DETAILED DESCRIPTION

In one embodiment, a product configuration display system provides a network connection to which a buyer terminal may be networked. The product configuration display system may advantageously utilize a web server to provide a network connection over the World Wide Web ("www"). The product configuration display system includes at least one three-dimensional representation or model of a product. The three-dimensional representation or model of the product is made to scale such that the product's component parts are in proportion to each other. The three-dimensional model can be rotated in one or more directions and at one or more speeds to illustrate multiple perspective views of the product.

A potential buyer uses a buyer terminal and a web browser to establish a network connection over the www with the product configuration display system. Once connected, the product configuration display system may advantageously display a web page containing a product presentation on the buyer terminal. The product presentation may initially include one or more three-dimensional representations of products from which the potential buyer makes a selection. The product presentation includes a product perspective view which is a view of a three-dimensional representation of the product.

The three-dimensional representation can be placed upon a representation of a carousel. The carousel can be stationary or may advantageously be rotating about a central axis and thus, displaying multiple product perspective views of the product. The representation of the carousel may advantageously be tilted or pitched in various directions and at various angles to display the three-dimensional representation at varying reference angles. The reference angle determines a viewer perspective; a view of the three-dimensional representation the viewer has. The three-dimensional representation is placed upon the representation of the carousel and therefore, as the representation of the carousel is rotated, the three-dimensional representation is also rotated, thus, providing a view from all angles. Additionally, the three-dimensional representation may be independently rotating while on the carousel. The three-dimensional representation may further be manipulated by rotating the three-dimensional representation about one or more axis and then placed upon the representation of the carousel.

Figure 15:
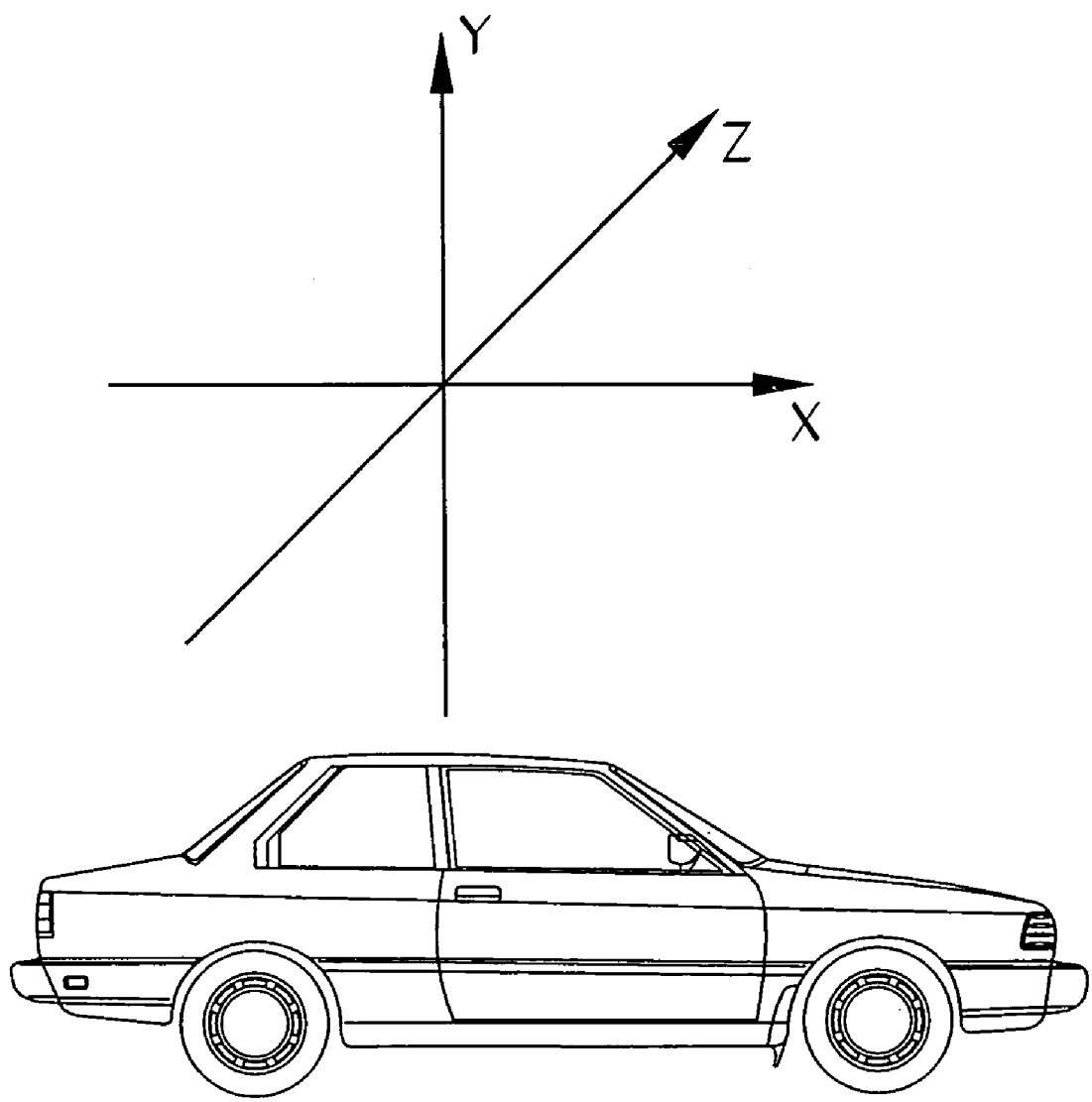
FIG. 15 is a diagram illustrating the possible axis of rotation according to one embodiment of the invention.

A horizontal rotator and a vertical rotator may advantageously be used to rotate the product about a first axis and a second axis. FIG. 15 generally illustrates the axis about which the product may be rotated. As illustrated in FIG. 15, the vertical axis is the Y axis (the axis in the vertical plane) and the horizontal axes are the X and Z axis (the axis in the horizontal plane). The Y axis passes from the top of a vehicle to the bottom of a vehicle. The X axis passes from the front of the vehicle to the back of the vehicle. The Z axis passes from one side of the vehicle to the other side of the vehicle.

Furthermore, the X and Z axes are offset ninety (90) degrees from each other in the horizontal plane. If a specific aspect is a point on the exterior of the product, the horizontal axis may advantageously be the X axis and the vertical axis may advantageously be the Y axis. If the specific aspect is a point within the interior of the product, the horizontal axis may advantageously be the Z axis and the vertical axis may advantageously be the Y axis. Thus, rotating about a first axis and a second axis provides a view of the product from all angles.

The product perspective view is capable of displaying the three-dimensional representation focused on one of a plurality of specific aspects. The specific aspect chosen determines the aspect of the three-dimensional representation that is brought into the central perspective of the viewer. The viewer becomes focused on the specific aspect. The product perspective view further displays the three-dimensional representation at a particular reference angle.

The specific aspect of the product may advantageously be a point on the exterior of the three-dimensional representation or, if the product has an interior cavity, a point within the interior of the three-dimensional representation. If the specific aspect is a point on the exterior of the three-dimensional representation, there may advantageously be a pre-selected number of exterior aspects of the product such as, by way of example, the front, the side, or the rear, from which the viewer may choose. The product perspective view displays the product focused in on the chosen product aspect. For example, the chosen product aspect may advantageously appear in the center of the display. The product perspective view may advantageously zoom in or out on the particular product aspect.

The product perspective view can display the three-dimensional representation having any portion of the exterior as the specific aspect. This may advantageously be accomplished by using the horizontal rotator and the vertical rotator. The horizontal rotator can be used to rotate the three-dimensional representation about the length of the vertical axis (the Y axis in FIG. 15). The three-dimensional representation can be rotated for any portion of or for the full three hundred and sixty (360) degrees. For example, the rotation may be for a range from zero (0) degrees to thirty (30) degrees. Alternatively, the rotation may be for a range from zero (0) degrees to ninety (90) degrees. The vertical axis is positioned at the center of the view area and not necessarily the center of the three-dimensional representation. The vertical rotator can be used to rotate the three-dimensional representation about the length of the horizontal axis (the X axis in FIG. 15). Likewise, the three-dimensional representation can be rotated for any portion of or for the full three hundred and sixty (360) degrees. For example, the rotation may be for a range from zero (0) degrees to thirty (30) degrees. Alternatively, the rotation may be for a range from zero (0) degrees to ninety (90) degrees. The horizontal axis is also positioned at the center of the view area and not necessarily the center of the three-dimensional representation. Thus, rotating the three-dimensional representation about the horizontal axis and vertical axis effectively positions the three-dimensional representation such that the viewer is able to view the three-dimensional representation from any reference angle. Furthermore, once positioned, the three-dimensional representation may advantageously be continuously rotated about either the vertical axis or the horizontal axis. The rotation is such that the viewer is in a fixed position and the product is being rotated about the axis. Moreover, the rotation is smooth in that the three-dimensional representation presents a view of the product that is complete at every segment or portion of the rotation.

If the specific aspect is a point within the interior of the three-dimensional representation, the specific aspect is the position from which the viewer is stationed and looking outward. There may advantageously be a pre-selected number of interior aspects of the product where the viewer may be stationed; the viewer's perspective is from the selected interior aspect. The viewer's perspective may advantageously be adjusted by altering the reference angle or view angle. For example, the reference angle may be adjusted for a range from zero (0) degrees to thirty (30) degrees. Alternatively, the reference angle may be adjusted for a range from zero (0) degrees to ninety (90) degrees. The reference angle determines the perspective view; the angle at which the potential buyer is looking out at from the selected aspect within the product. The outward view may advantageously include detail views of the interior of the product as well as the exterior of the product.

The reference angle may be adjusted by using the previously described horizontal adjustor and vertical adjustor. Rotating the viewer's perspective about the horizontal axis (the Z axis in FIG. 15) and vertical axis (the Y axis in FIG. 15) effectively adjusts the reference angle such that the viewer is able to view outward from the pre-selected position within the product from any reference angle. The intersection of the two axes occurs inside the viewer's head. For example, the horizontal axis may advantageously pass through from one side of the viewer's head to the other side of the viewer's head. The vertical axis may advantageously pass through from the top of the viewer's head to the bottom of the viewer's head (down the viewer's spine). Furthermore, once positioned, the outward view may advantageously be continuously rotated about either the vertical axis or the horizontal axis. Alternatively, the rotation may advantageously be for a portion of the three hundred and sixty (360) degrees. For example, the rotation may be for a range from zero (0) degrees to thirty (30) degrees. Alternatively, the rotation may be for a range from zero (0) degrees to ninety (90) degrees. The rotation is such that, from the viewer's point of view, the product appears to remain in a fixed position and the viewer's head is being rotated about the axis. Moreover, the rotation is smooth in that the three-dimensional model presents a view of the interior that is complete at every segment or portion of the rotation.

The product configuration display system can create a display of the three-dimensional representation in varying degrees of zoom. The degrees of zoom are continuous such that zooming in or out displays the three-dimensional representation smoothly and continuously, without any break. The zoom can be set to display the three-dimensional representation, or any part thereof, at various zoom levels. The zoom can be focused on the specific aspect selected by the viewer. If the specific aspect is a point on the exterior of the three-dimensional representation, the zoom causes the display to be focused upon the specific aspect at the current reference angle. If the specific aspect is a location within the interior of the three-dimensional representation, the zoom focus is determined by the reference angle or view angle. Furthermore, the product configuration display system may advantageously zoom substantially up to a macro level. For example, the product configuration display system can zoom in up close to the object being displayed.

The product configuration display system may advantageously include three-dimensional representations or models of additional products. These three-dimensional representations can then be used to create a three-dimensional representation of a combination product. By way of example, the combination product can be created by combining a first three-dimensional representation with a second three dimensional representation, removing a first three-dimensional representation from a second three-dimensional representation, or replacing a first three dimensional representation contained in a second three-dimensional representation with a third three-dimensional representation. The three-dimensional representation of the combination product is analogous to a three-dimensional representation of a product configuration. Thus, the product presentation displayed on the buyer terminal may advantageously be of a product configuration.

Every three-dimensional representation is created to the same scale. The identical scaling enables the product configuration display system to generate product configurations that are realistic by enabling the system to determine logical locations about or within the three-dimensional representation. For example, combining a first three-dimensional representation to a second three-dimensional representation substantially about the logical location creates a realistic combination product. Knowing where a first three-dimensional representation is substantially located about a second three-dimensional representation enables the configuration display system to remove the first three-dimensional representation from the second three-dimensional representation. Likewise, knowing where a first three-dimensional representation is substantially located about a second three-dimensional representation enables the configuration display system to remove the first three-dimensional representation with a third three-dimensional representation. Moreover, a plurality of three-dimensional representations may advantageously be combined with yet a different three-dimensional representation.

The identical scaling of each three-dimensional representation enables the configuration display system to generate a realistic depiction of one or more three-dimensional representations. One or more three-dimensional representations may then be placed side-by-side in a visual product comparison. The visual side-by-side product comparison advantageously illustrates accurately the distinctions such as, by way of example, size and shape, between the products because of the substantially identical scaling. One or more three-dimensional representations may advantageously be superimposed upon each other to further illustrate the differences between the products. The three-dimensional representations included in these product comparisons may display perspective views in substantially the same manner as previously discussed.

A potential buyer desiring to thoroughly research a desired product before making a purchasing decision can utilize a buyer terminal and access the product configuration display system. The product configuration display system can generate on the buyer terminal product perspective views substantially similar to product views the potential buyer would observe if the buyer was physically with the product.

The potential buyer can advantageously cause the manipulation of the product perspective view in order to fully experience the product. As an example, the potential buyer may request the product configuration display system to display the product from all angles, to focus upon a particular product aspect, to zoom in or out on the particular product aspect, to alter the reference angle of view, to display three-dimensional representations of other products for comparison purposes, and to accordingly modify the three-dimensional representation in order to illustrate differing product configurations. Moreover, the potential buyer may further request the product configuration display system to save one or more product configurations for subsequent analysis, to create brochures for the product configurations, and to submit a purchase request for a desired product appropriately configured.

Even though the invention is suitable for displaying and configuring any product, the invention will be further disclosed in the context of displaying and configuring a vehicle. Throughout the drawings, components which correspond to components shown in previous figures are indicated using the same reference numbers.

In one embodiment of the invention, a product configuration display system facilitates the displaying and the configuring of a three-dimensional representation of a vehicle by a potential buyer. The product configuration display system provides a network connection to which the potential buyer can access the product configuration display system over the network.

Computer networks suitable for use with the present invention include local area networks (LAN), wide area networks (WAN), Internet, or other connection services and network variations such as the World Wide Web, the public internet, a private internet, a private computer network, a secure internet, a private network, a public network, a value-added network, and the like. The computers connected to the network may be any microprocessor controlled device that permits access to the network, including terminal devices, such as personal computers, workstations, servers, mini computers, main-frame computers, laptop computers, mobile computers, palm top computers, hand held computers, set top box for a TV, or a combination thereof. The computers may further possess input devices such as a keyboard or a mouse, and output devices such as a computer screen or a speaker. The computer network may include one or more LANs, WANs, Internets, and computers. The computers may serve as servers, clients, or a combination thereof.

Figure 1:
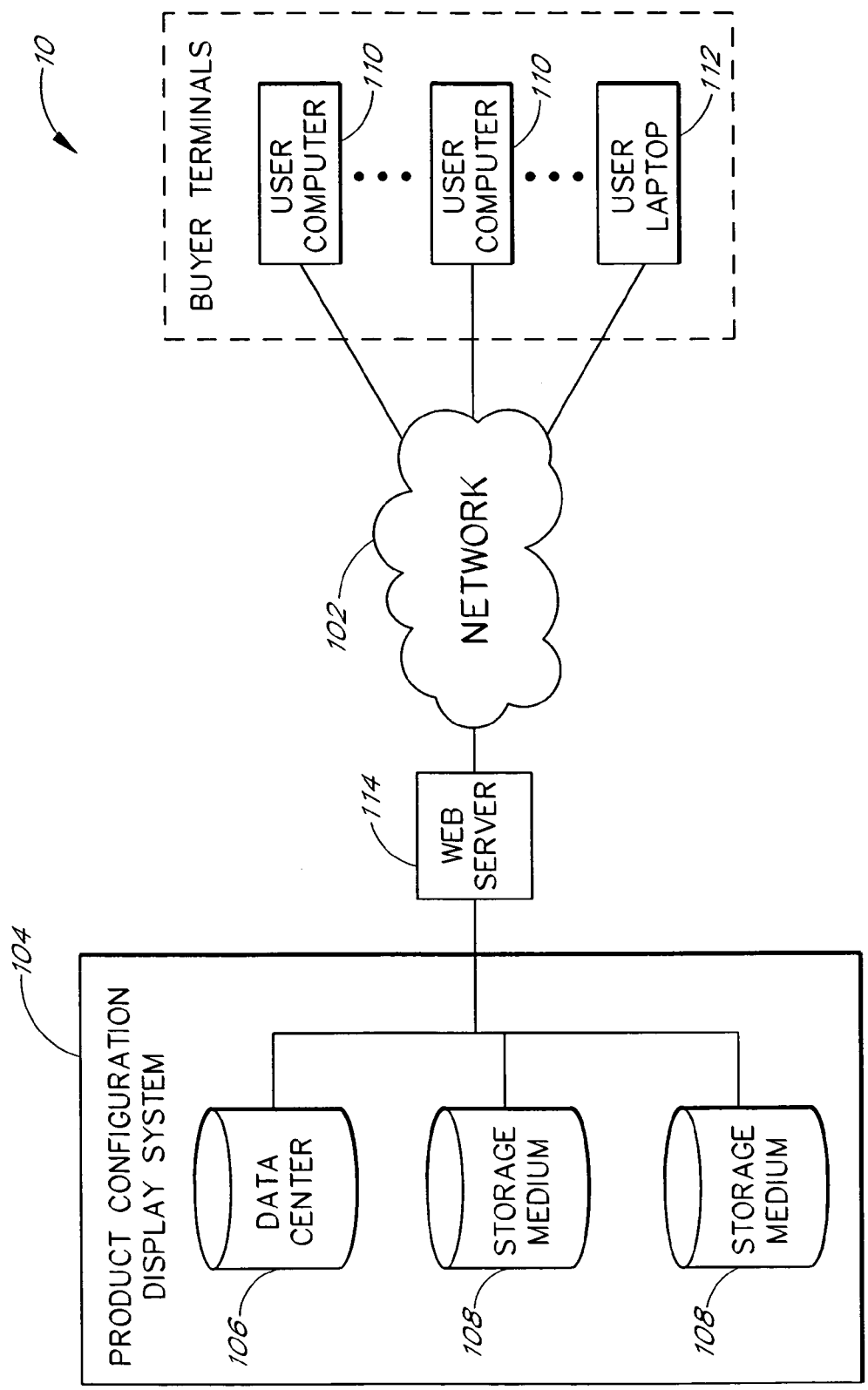
FIG. 1 is a system block diagram illustrating an embodiment of the overall network architecture of the invention.

One network architecture suitable for use with one embodiment of the invention is indicated generally by a system 10 in FIG. 1. The system 10 may include a network 102, which represents a computer network as previously described, providing network connection between the attached devices. The system 10 may further include a product configuration display system 104 which is connectable by one or more buyer terminals through a web server 114. The product configuration display system 104 and the buyer terminals may be connected to the network 102 directly of through a connection device such as a router or other similar mechanisms.

In one embodiment, the system 10 conforms to the Transmission Control Protocol/internet Protocol (TCP/IP) industry standard. In other embodiments, the system 10 may conform to other network standards, including, but not limited to, the International Standards Organization's Open Systems Interconnection, IBM's SNA®, Novell's Netware®, and Banyon VINES®, that facilitate communication between the attached devices.

In one embodiment of the invention, the product configuration display system 104 includes a data center 106 and one or more storage mediums 108. The data center 106 is operably connected to a storage media such as, by way of example, random access memory, non-volatile storage media, or the storage medium 108. The product configuration display system programs and the product configuration display system databases comprising the product configuration display system 104 preferably reside on one or more computers comprising the data center 106 and one or more storage mediums 108. Those of ordinary skill in the art will realize that the storage mediums 108 may advantageously be contained in the computers comprising the data center 106.

These computers may be uniprocessor or multiprocessor machines. Additionally, these computers include an addressable storage medium such as, by way of example, random access memory, and may further include a non-volatile storage medium such as, by way of example, a magnetic or an optical disk. The addressable storage medium and/or the non-volatile storage medium may advantageously contain a specific physical substrate configuration such as, for example, a computer program, representing data and instructions which cause the computer to operate in a specific and predefined manner as described herein.

The network 102 may connect devices, such as a user computer 110 or a user laptop 112, for example, by use of a modem or by use of a network interface card. As illustrated, potential buyers may utilize such devices to remotely access the product configuration display system 104 via the network 102. The device used to provide access to the product configuration display system 104 and the data center 106 may be referred to herein as a buyer terminal. This term is intended to include any device useful for providing access to the product configuration display system 104.

Although particular computer systems and network components are shown, those of ordinary skill in the art will appreciate that the present invention also works with a variety of other networks and components.

In accordance with one embodiment of the invention, the product configuration display system 104 is connected to the Internet and utilizes the web server 114 to provide connection capabilities over a World Wide Web ("www"). A suitable web server 114 is detailed in the co-pending and commonly owned U.S. patent application entitled REAL TIME COMMUNICATION OF PURCHASE REQUESTS having an application Ser. No. 09/231,409 and a filing date of Jan. 14, 1999, and which is hereby incorporated by reference in its entirety. A remotely located potential buyer may access the product configuration display system 104 by utilizing a standard web browser executing on a buyer terminal and establishing a network connection to the web server 114. Via the web server 114, the potential buyer may advantageously be provided with web pages enabling the buyer to access the product configuration display system 104.

In one embodiment, the storage medium 108 may be configured as a database from which information can be both stored, updated, and retrieved. The information may be such things as, by way of example, three-dimensional representations of one or more vehicles, vehicle specific information, three-dimensional representations of vehicle accessories, and definitions of one or more web pages comprising the product configuration display system 104. The product configuration display system programs may provide access to the information stored on the storage medium 108.

In one embodiment, the data center 106 includes at least one three-dimensional representation of a vehicle. The three-dimensional representation may advantageously be a three-dimensional model created through the standard three-dimensional modeling process generally known as "digitizing". There are a number of ways to obtain a three-dimensional digitized representation of the desired product. One way involves taping the surface of strategic portions of both the interior and exterior of the vehicle. A digitizing arm is then used to trace over the taped area. The digitizing arm is operably connected to a computing device which uses the input generated during the tracing process to generate a three-dimensional model information of the vehicle. A suitable digitizing arm is a Faro Digitizing Arm manufactured by Faro. Digitizing processes used in the modeling industry to generate three-dimensional computer models of physical items are well known. Companies such as 3name3d are familiar with three-dimensional digitization and may advantageously be able to create a three-dimensional model of the interior end exterior of a vehicle suitable for use in one preferred embodiment of the invention. In a further embodiment, with the development of the three-dimensional photographic technology, a three-dimensional camera may be used to create the three-dimensional model of the vehicle.

The three-dimensional model information advantageously includes information regarding the actual physical characteristics of the vehicle. The physical characteristics are such things as, by way of example, the shape of the exterior of the vehicle, the shape of the hood, the slope of the hood, the shape of the windshield, the contour of the windshield, the slope of the windshield, the shape of the wheels, the shape of the tires, the shape of the side panel, the shape of the seats, and so on. The three-dimensional model information further comprises the necessary information regarding the physical characteristics, such as, by way of example, the location of each vehicle part in relation to every other vehicle part, to create the vehicle model.

In another embodiment, the three-dimensional model information may advantageously include information regarding the moving parts of the vehicle such as doors, engine hood, trunk, wheels, and seats. The three-dimensional model information can include the range of motion information for these moveable objects. Thus, the three-dimensional model information can create models in which the moveable parts are in motion or may be moved. In yet another embodiment, the digitizing process can be used to generate information regarding the engine or other ordinarily hidden components or features of the vehicle.

In one embodiment, three-dimensional models of varying resolutions may be generated for each vehicle. The higher resolution three-dimensional models can be used for displaying stationary or near stationary images of the vehicle. The lower resolution three-dimensional models may advantageously be used for displaying the vehicle while in motion. In one embodiment, the lower resolution three-dimensional models are preferably between one-third ($1/3$) to one-half ($1/2$) the resolution of the higher resolution three-dimensional models. In another embodiment, the lower resolution three-dimensional models are between one-ninth ($1/9$) to one-tenth ($1/10$) the resolution of the higher resolution three-dimensional models. It is commonly understood that as computing and networking technologies advance, better resolution models may be used for displaying both stationary and non-stationary images of vehicles.

In one embodiment, the aftermarket products, including vehicle accessories, are similarly processed to create a three-dimensional model for each product. The aftermarket products may advantageously be considered sub-products. If the product is small, a three-dimensional scanner of a kind well known in the art, may advantageously be used to generate the three-dimensional model information. Otherwise, the digitizing process previously described can be employed to create the three-dimensional model information.

The three-dimensional models are generated to the same scale for each vehicle and aftermarket product. Identical scaling enables the proper installation of a vehicle accessory on a vehicle, just as if the actual accessory is being installed on an actual vehicle. Identical scaling also enables realistic size and shape comparisons between vehicles and products. Thus, the product configuration display system 104 provides to a potential buyer accessing the system a real-life experience over the Internet and away from the traditional vehicle dealership.

The three-dimensional model information enables operations to be performed on the three-dimensional models. There are a number of products that enable the manipulation of the three-dimensional models. One such product which enables operations and manipulations to be performed is a product called metastream developed by MetaCreations. MetaCreations is located in Northern California. The metastream product is a "plug-in" for the web browser, and the product enables a potential buyer utilizing a web browser with the "plug-in" installed, to display and manipulate the three-dimensional model over the World Wide Web.

The three-dimensional model information enables the data center 106 to determine the location of any point on a vehicle. Then, as the vehicle's position changes, the data center 106 can track the relative location of the point. Furthermore, the data center 106 can determine if the point is visible in the changed location. As an example, the data center 106 can determine the position of the driver's door from the three-dimensional model information. Depending on the reference angle the three-dimensional model is to be displayed in the product perspective view, the data center 106 can also determine if the driver's door is visible or hidden (out of view) to the viewer. If the door is visible, the data center 106 can determine how much of the door is visible and at what angle of display. The three-dimensional model information enables the data center 106 to determine, at any instance in time and motion, the positioning of any point on the vehicle.

Figure 2:
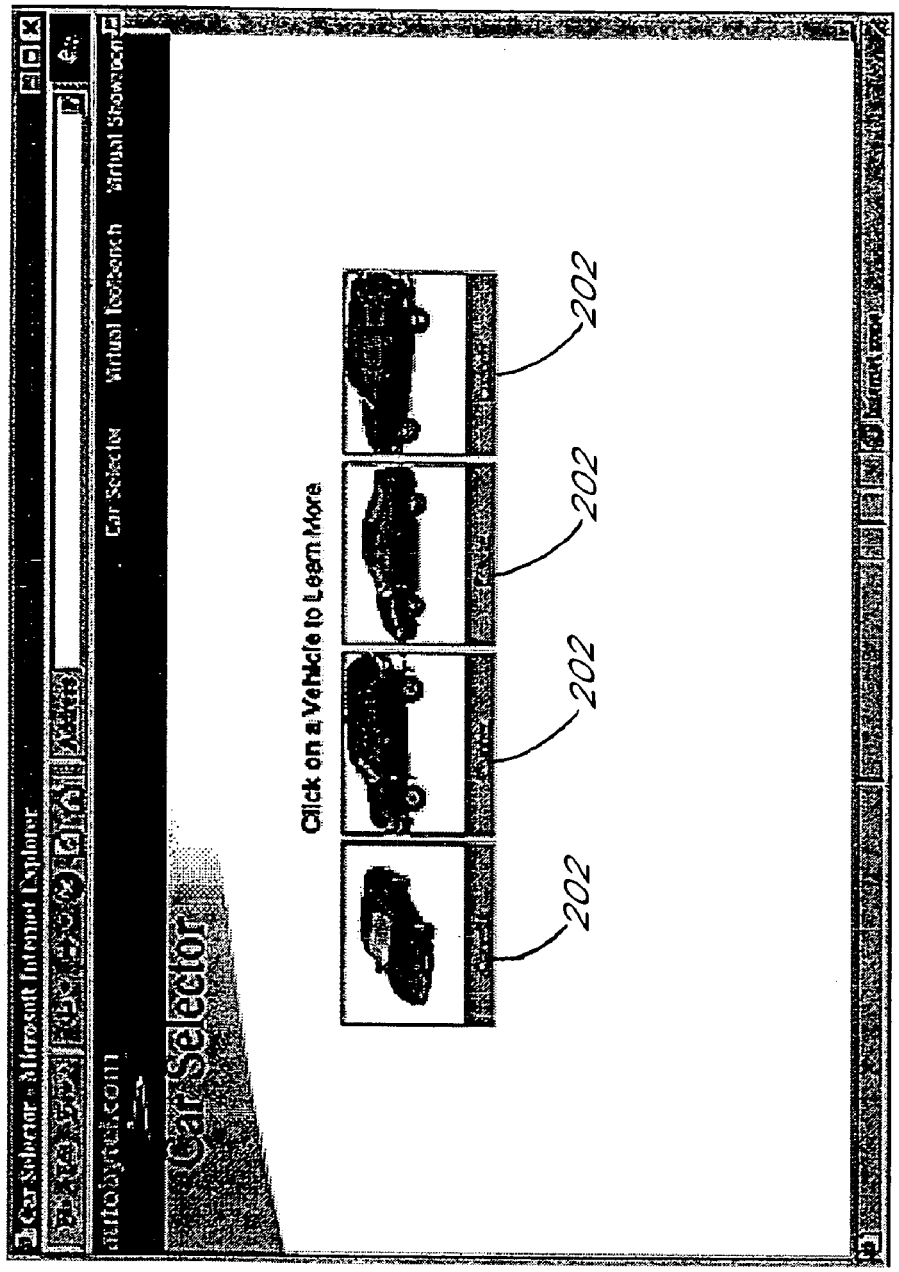
FIG. 2 is a representation of one embodiment of a first web page displayed by a product display module on a buyer terminal.

In one embodiment, the data center 106 comprises a product display module. The product display module advantageously includes one or more definitions of a product display screen. When accessed by a buyer terminal, the product display module can use the product display screen definitions to create at least a first web page on the buyer terminal. FIG. 2 generally illustrates such a web page suitable for use in one embodiment of the invention. The first web page may advantageously be accessed from a remote location through a hypertext link or: other similar web addressing mechanism. As an example, the first web page may be accessed through any of the web pages detailed in the co-pending and commonly owned U.S. patent application entitled REAL TIME COMMUNICATION OF PURCHASE REQUESTS having the application Ser. No. 09/231,049 and the filing date of Jan. 14, 1999, and which is hereby incorporated by reference in its entirety.

The first web page includes one or more vehicle selection boxes 202 listing the vehicles available in the product configuration display system 104. Advantageously, the product configuration display system 104 includes three-dimensional digital models for all the available vehicle models. Moreover, the product configuration display system 104 may advantageously be continuously updated to include recent vehicle models. In one embodiment, the vehicle selection boxes 202 include a product presentation displaying a perspective view of the vehicle. In another embodiment, multiple perspective views of the vehicle may be presented by rotating or otherwise putting in motion the three-dimensional model of the vehicle, thus, affording a view from multiple angles. As illustrated in FIG. 2, the perspective views of each vehicle may display the vehicle in varying reference angles and states of rotation. In another embodiment, each perspective view may be synchronized as to their reference angle and rotation. In a further embodiment, the vehicle selection boxes 202 may be implemented as hypertext links without a product presentation.

Figure 3:
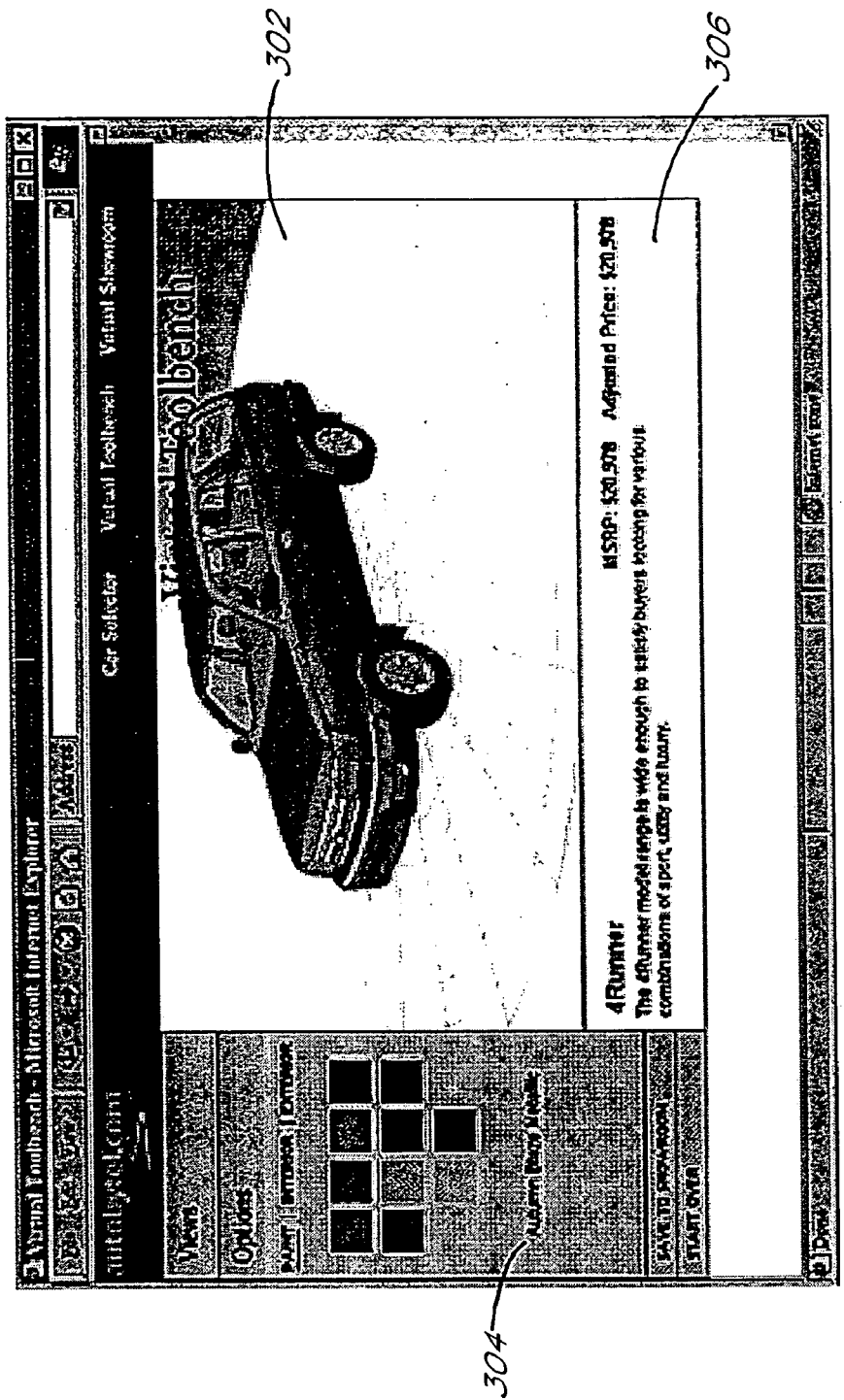
FIG. 3 is a representation of one embodiment of a second web page displayed by a product display module on a buyer terminal.

Clicking on a vehicle selection box 202, or the hypertext link, using a pointing device such as a mouse, or the like, causes the product display module to display a second web page. FIG. 3 generally illustrates such a web page suitable for use in one embodiment of the invention. In one embodiment, the second web page includes a product display area 302, a configuration panel 304, and a product description area 306. The product display module accesses the three-dimensional model information for the selected vehicle to generate a display of the selected vehicle in the product display area 302. The product presentation is made in the product display area 302.

Figure 6:
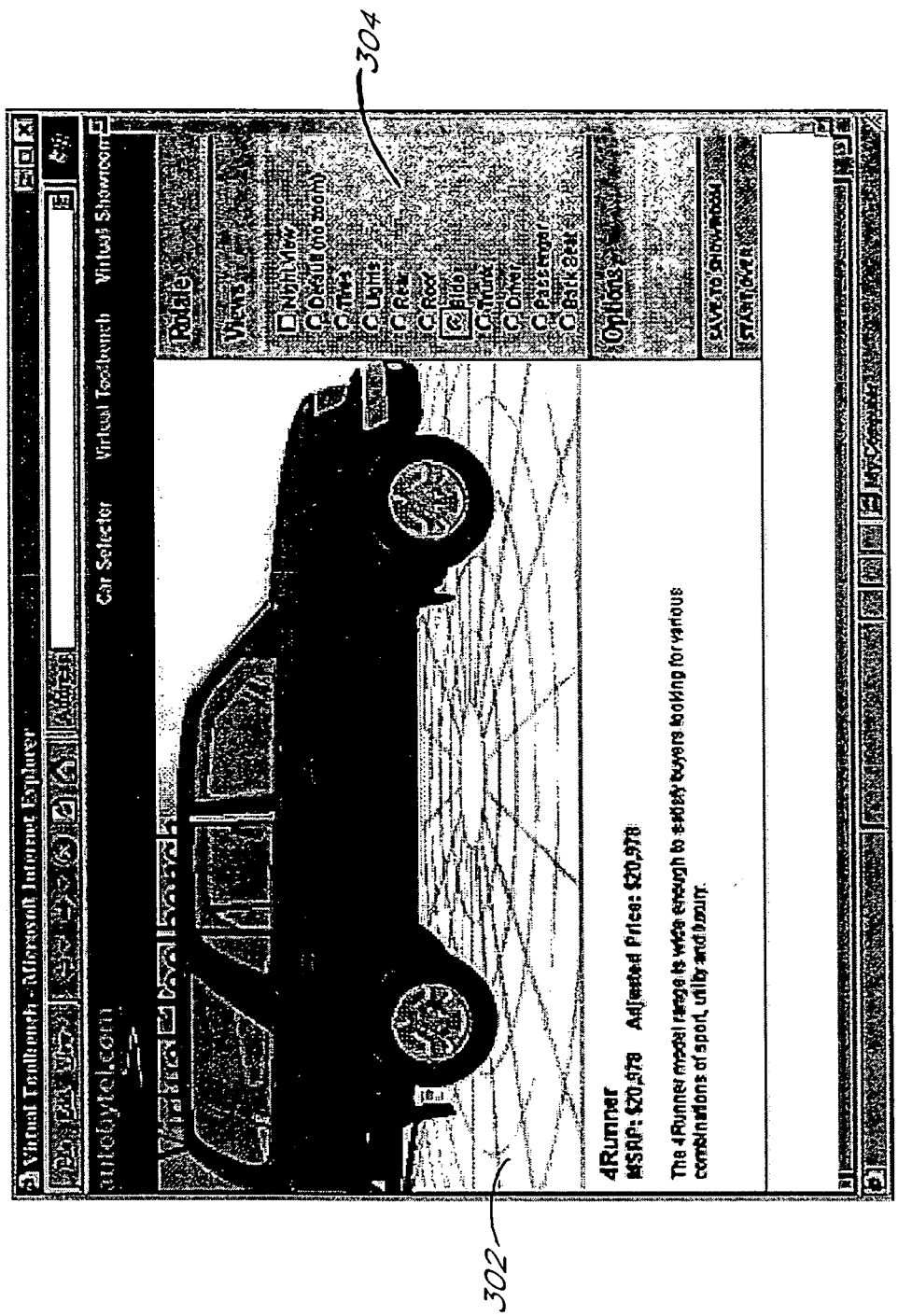
FIG. 6 is a representation of one embodiment of a web page including a configuration panel.

In one embodiment, the configuration panel 304 can be positioned to the left of the product display area 302 as illustrated in FIG. 3. In another embodiment, the configuration panel 304 may be positioned to the right of the product display area 302 as illustrated in FIG. 6. In one embodiment, the product configuration panel 304 can be implemented as one or more collapsible windows as illustrated in FIG. 3. Clicking on a collapsed configuration operation using a pointing device such as a mouse, or the like, expands the display to show the options available. Clicking on an expanded configuration operation collapses the display, hiding the available options. For example, clicking on "Options" displays the selections "PAINT", "INTERIOR", and "EXTERIOR". Further clicking on "PAINT" displays a color palette as illustrated in FIG. 3. Other configuration operations may likewise be implemented as collapsible windows. In another embodiment, the product configuration panel 304 may be implemented as, by way of example, one or more pull-down windows.

A potential buyer can request to alter the product presentation using the product configuration panel 304. The request to alter the product presentation may advantageously include, for example, a request to alter the vehicle's perspective view displayed in the product display area 302 or a request to configure the vehicle according to the potential buyer's desires. The product presentation is accordingly altered based on the request, and the product display module displays the newly created product presentation in the product display area 302.

In one embodiment, the configuration panel 304 may advantageously include a option permitting the potential buyer to submit a purchase request for the vehicle as presented in the product display area 302. The option can be implemented as a hypertext link permitting access to one or more web pages through which the potential buyer may submit the necessary information to request the desirably configured vehicle displayed in the product display area 302. Details on submitting a purchase request as well as the web pages suitable for use in one embodiment of the invention are included in the co-pending and commonly owned U.S. patent application entitled REAL TIME COMMUNICATION OF PURCHASE REQUESTS having the application Ser. No. 09/231,409 and the filing date of Jan. 14, 1999, and which is hereby incorporated by reference in its entirety.

In one embodiment, the product description area 306 displays the Manufacturer's Suggested Retail Price ("MSRP") and the Adjusted Price of the vehicle displayed in the product display area 302. The MSRP is the base price of the vehicle as delivered from the factory without any aftermarket options. The Adjusted Price is the price of the vehicle as currently configured by the potential buyer. As an example, if the potential buyer configures the vehicle to include an aftermarket option such as a tire mount (often seen on the back of Sport Utility Vehicles), the Adjusted Price will be the price of the vehicle plus the price of the tire mount. The product description area 306 additionally displays a description of the displayed vehicle. In another embodiment, the product description area 306 may include an itemized list of the aftermarket products currently selected by the potential buyer. The list may also include the price of each aftermarket product. In yet another embodiment, the product description area 306 may be implemented as a scrollable window enabling the display of additional information.

In a further embodiment, the information displayed in the product description area 306, along with additional vehicle information, may be presented in audio and/or video form. In one example, clicking on a hypertext link may activate an audio presentation describing the vehicle as well as the aftermarket products available for the vehicle. In another example, clicking on a hypertext link may activate a streaming video presentation on the buyer terminal. The video presentation may advantageously include a person showing and describing the features and benefits of the selected vehicle as well as the aftermarket options available for the vehicle. In yet another embodiment, a three-dimensional model of a salesperson may appear in the product display area 302. The three-dimensional model of the salesperson may be moving about the vehicle detailing and describing the benefits of the displayed vehicle and the available aftermarket products. The vehicle's perspective view may advantageously be changing, including the movement of moveable parts, during the presentation.

Figure 4:
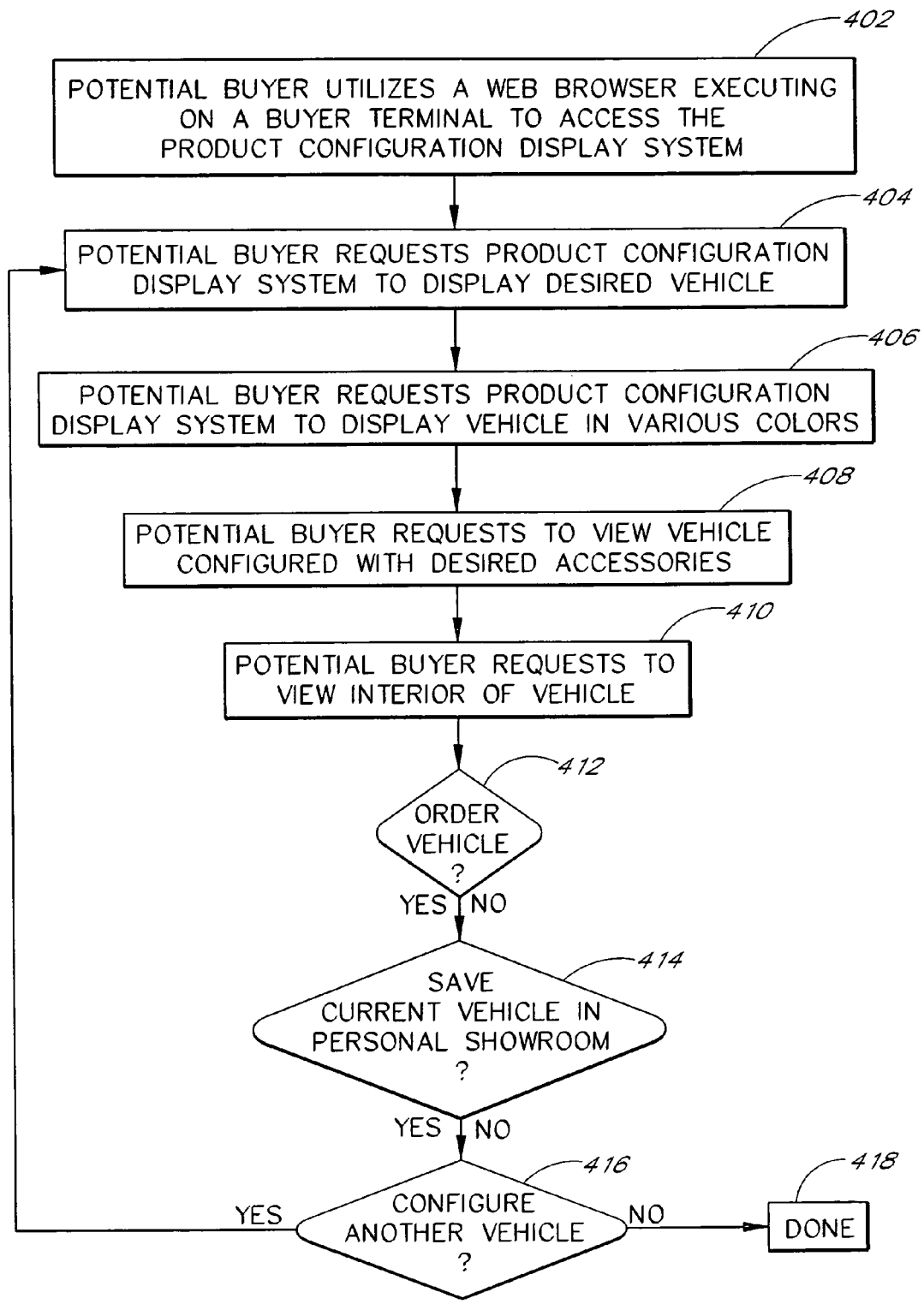
FIG. 4 is a flow chart generally illustrating a product configuration process according to one embodiment of the invention.

FIG. 4 is a flow chart generally illustrating a product configuration process according to one embodiment of the invention. In particular, at a step 402, a potential buyer utilizes a web browser executing on a buyer terminal to access the product configuration display system 104. The potential buyer may advantageously access the product configuration display system 104 by providing a URL or by utilizing a hypertext link from one or more linked web pages and/or web sites. The potential buyer may navigate through one or more web pages to access the first web page illustrated in FIG. 2 and previously described. At a step 404, the potential buyer may advantageously request the product configuration display system 104 to display a desired vehicle by selecting the vehicle selection box 202 for the desired vehicle.

As an example, the potential buyer may desire to view and configure a Toyota 4Runner. The potential buyer can select the vehicle selection box 202 for the Toyota 4Runner from the first web page. In one embodiment, the product display module may then advantageously display the Toyota 4Runner in the product display area 302 as generally illustrated in FIG. 3. In another embodiment, the potential buyer may directly access the web page generally illustrated in FIG. 3 from a web page, other than the first web page, that included a hypertext link to this web page.

Figure 5:
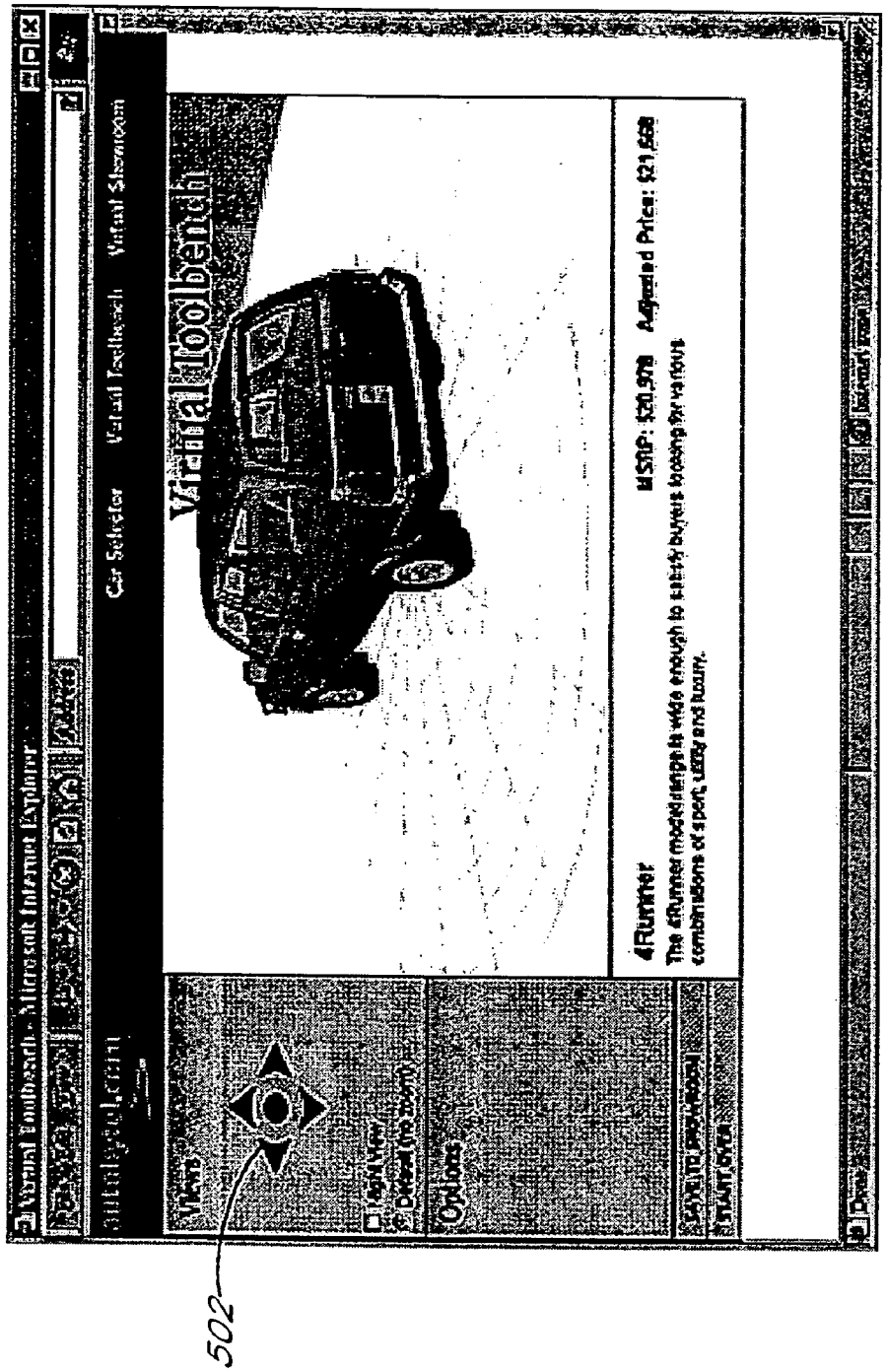
FIG. 5 is a representation of one embodiment of a web page including a carousel pitch control displayed in a configuration panel.

In one embodiment, the product display module can display the Toyota 4Runner on top of a simulated carousel as illustrated in the product display area 302 (FIG. 3). The carousel may be titled or pitched from back to front at an angle as illustrated in FIG. 3. The carousel may advantageously be rotating about its central axis, thus displaying multiple perspective views of the Toyota 4Runner in the product display area 302. A carousel pitch control 502 (FIG. 5) located in the configuration panel 304 may advantageously provide the potential buyer the capability to alter the direction and/or the angle of pitch. The potential buyer can use the carousel pitch control 502 to view the vehicle from many reference angles. For example, FIG. 5 illustrates the Toyota 4Runner from a different reference angle. Therefore, the potential buyer can view the vehicle from all angles as if the buyer was at a dealership. In another embodiment, the Toyota 4Runner may be independently rotating on top of a simulated surface of a carousel. In yet another embodiment, the potential buyer may rotate the Toyota 4Runner about a horizontal axis and a vertical axis and then place the Toyota 4Runner on top of the simulated carousel using a control device such as a mouse or keyboard. In a further embodiment, the potential buyer may reposition the Toyota 4Runner on top of the carousel such that the Toyota 4Runner will be rotating about a different point such as, by way of example, the middle of the hood, the center of the tail gate, or about a line passing vertically through the center of the front grill, as the carousel spins about its central axis.

In one embodiment, the product display module displays multiple perspective views of the Toyota 4Runner by utilizing a three-dimensional model information of the Toyota 4Runner. As the perspective view of the Toyota 4Runner is altered, the product display module utilizes the three-dimensional model information to recreate the model of the Toyota 4Runner on the buyer terminal. As previously discussed, a lower resolution three-dimensional model of the Toyota 4Runner may be used to display the Toyota 4Runner in motion. This procedure generally applies to the displaying of the other vehicles in the product configuration display system 104.

In one embodiment, the potential buyer may request to view the Toyota 4Runner focused on a specific aspect of the vehicle such as, by way of example, the tires, the lights, the rear, the roof, the side, the trunk, the driver, the passenger, and the back seat. The potential buyer may select the desired aspect from the configuration panel 304 as illustrated in FIG. 6. For example, the potential buyer can request to view the Toyota 4Runner focused on the side of the Toyota 4Runner. The product display module may advantageously display the Toyota 4Runner with its side brought into the central perspective of the potential buyer as illustrated in the product display area 302 in FIG. 6. In one embodiment, the product display module initially displays the Toyota 4Runner at a default reference angle. The potential buyer may subsequently adjust the reference angle by using the carousel pitch control 502 (FIG. 5). Pressing up or down on the pitch control 502 may advantageously start rotating the vehicle about the horizontal axis in the respective direction. Pressing left or right on the pitch control 502 may advantageously start rotating the vehicle about the vertical axis in the respective direction. The potential buyer may advantageously request the product display module to display the Toyota 4Runner zoomed in or out on the chosen aspect of the Toyota 4Runner.

In one embodiment, the potential buyer can alter the perspective view of the Toyota 4Runner by rotating the three-dimensional model of the Toyota 4Runner displayed in the product display area 302 (FIG. 6). The potential buyer may advantageously use a horizontal rotator and a vertical rotator, similar to the carousel pitch controller 502 (FIG. 5), to request the product display module to display a different perspective view of the Toyota 4Runner. For example, the potential buyer can rotate the Toyota 4Runner about a horizontal axis (the X axis illustrated in FIG. 15) and a vertical axis (the Y axis illustrated in FIG. 15) to view the vehicle from all angles. The potential buyer may continuously rotate the Toyota 4Runner about either axis at varying speeds to create a visual sensation similar to that experienced by walking around and observing the vehicle. Moreover, the potential buyer can change the direction of rotation as well as the speed of rotation. In a further embodiment, the perspective view of the Toyota 4Runner may be altered by rotating about the X axis, the Y axis, and the Z axis illustrated in FIG. 15.

In another embodiment, the potential buyer may request the product display module to display the Toyota 4Runner as if it is being driven across the product display area 302. In yet another embodiment, the potential buyer may request the product display module to display the Toyota 4Runner with its moveable parts, such as the hood, in motion (opening and closing), thus affording a view of the engine. In a further embodiment, the potential buyer may request the product display module display certain sections, also advantageously considered sub-products, of the Toyota 4Runner such as, by way of example, the engine, the front, the passenger compartment, or the trunk. The potential buyer may perform substantially the same operations on the sectional displays as the buyer can on the entire vehicle.

In one embodiment, the aspects of lighting and shading such as, by way of example, the reflective areas on a vehicle, the reflective areas on an aftermarket product accessory, and the shadows cast onto one vehicle section or part from another vehicle section or part, are features of the environment as compared to the actual physical characteristics of the vehicle previously described. Therefore, the reflection on the surface of the vehicle displayed in the product display area 302 is not "fixed." The reflection exists because there is a "fixed light source" giving the viewer the impression light is being cast into the product display area 302 from a fixed point. For example, if the light source physically existed, it would be somewhere outside the buyer terminal casting light into the buyer terminal, and likewise, casting shadows as appropriate. Thus, as the vehicle's perspective view changes, the lighting and shading of the vehicle changes accordingly.

Another example of the lighting and shading is in the glass windows of the vehicle. These windows experience different reflective properties and sheens relative to their position, how the vehicle is rotated, and so on. The product display module creates the proper lighting and shading characteristics for the vehicle depending on the perspective view of the vehicle displayed in the product display area 302.

In one embodiment, the potential buyer can request to view the Toyota 4Runner in a nighttime view, as if the buyer is viewing an actual Toyota 4Runner at night with its lights on. The product display module can adjust the lighting and shading to display the Toyota 4Runner as it would be seen at night. The headlights and taillights, in addition to the dash lights and other interior lighting may advantageously be illuminated in the product presentation. In one embodiment, the vehicle advantageously is shown in the exterior lighting conditions that would approximate those that would exist where there is a full moon out at night. Alternatively, the lighting could be approximately the level of light available from a lighted street lamp. In one preferred embodiment, the potential buyer may advantageously be permitted to adjust the exterior lighting level for displaying from daylight to black. In another embodiment, the potential buyer may adjust the illumination level of the interior lighting, as well as turn on or turn off the high beam.

Figure 7:
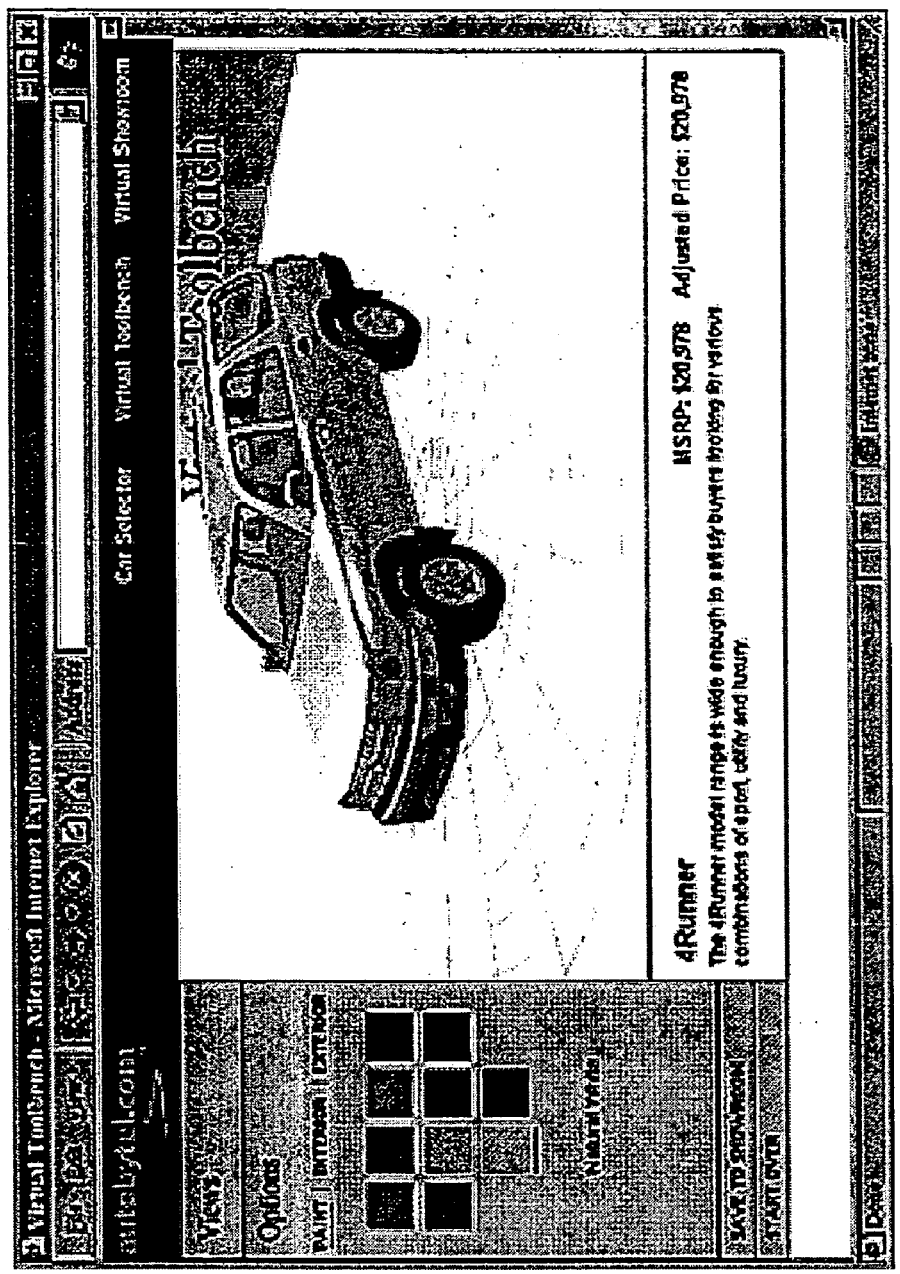
FIG. 7 is a representation of one embodiment of a web page including a perspective view of a vehicle displayed in a product display area.

At a step 406, the potential buyer may advantageously request the product configuration display system 104 to display the vehicle in various colors. In one embodiment, the vehicle is displayed initially in a default color such as black. For example, a black Toyota 4Runner may initially be displayed in the product display area 302 (FIG. 3). The potential buyer can request the product display module to display a white Toyota 4Runner by selecting the appropriate color palette in the configuration panel 304 (FIG. 3). The product display module may then advantageously display a white Toyota 4Runner in the product display area 302 as illustrated in FIG. 7. The potential buyer may view the Toyota 4Runner in all the colors available from the factory. In another embodiment, the product display module may provide additional colors which the potential buyer can choose from. These additional colors may be offered as aftermarket vehicle paint jobs which the potential buyer can purchase from an aftermarket supplier. In yet another embodiment, the potential buyer may select to view different interior colors and color combinations for the Toyota 4Runner.

In one embodiment, the colors and textures of the vehicle interiors and exteriors, as well as the aftermarket products, are also treated as "objects" of the environment much like the lighting and shading. The colors and textures are respectively applied to the base three-dimensional model of the vehicle or aftermarket product upon demand by the product display module (either the default color or the color selected by the potential buyer). Because the color is an "object" of the environment, the product display module, or any other configuration display system program, can advantageously swap out the color "object" almost instantaneously. This is because the three-dimensional model information facilitates the determination of the surface area of the vehicle. Note that the same basic digitized model is used for each different configuration. It is the "skin" that is changed to display different colors or textures.

Figure 8:
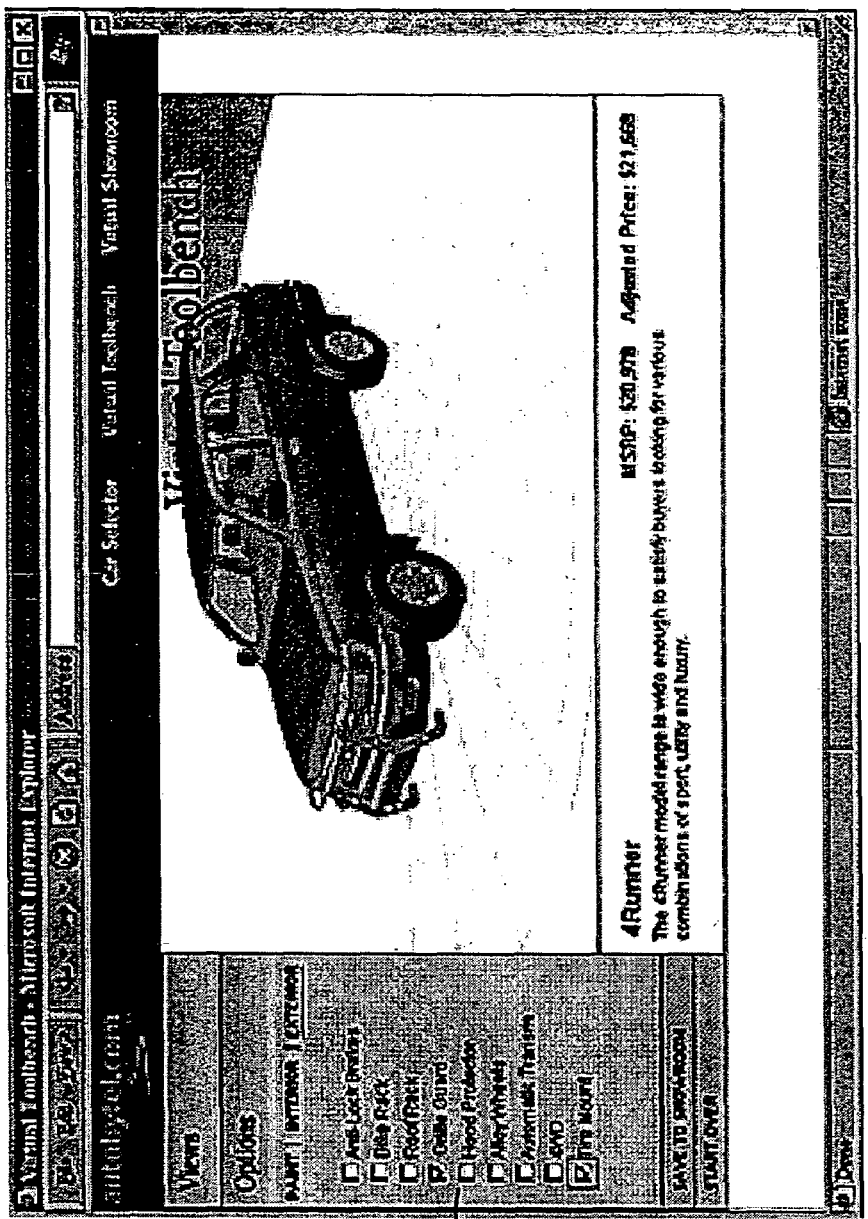
FIG. 8 is a representation of one embodiment of a web page including a list of selectable exterior options displayed in a configuration panel.
Figure 9:
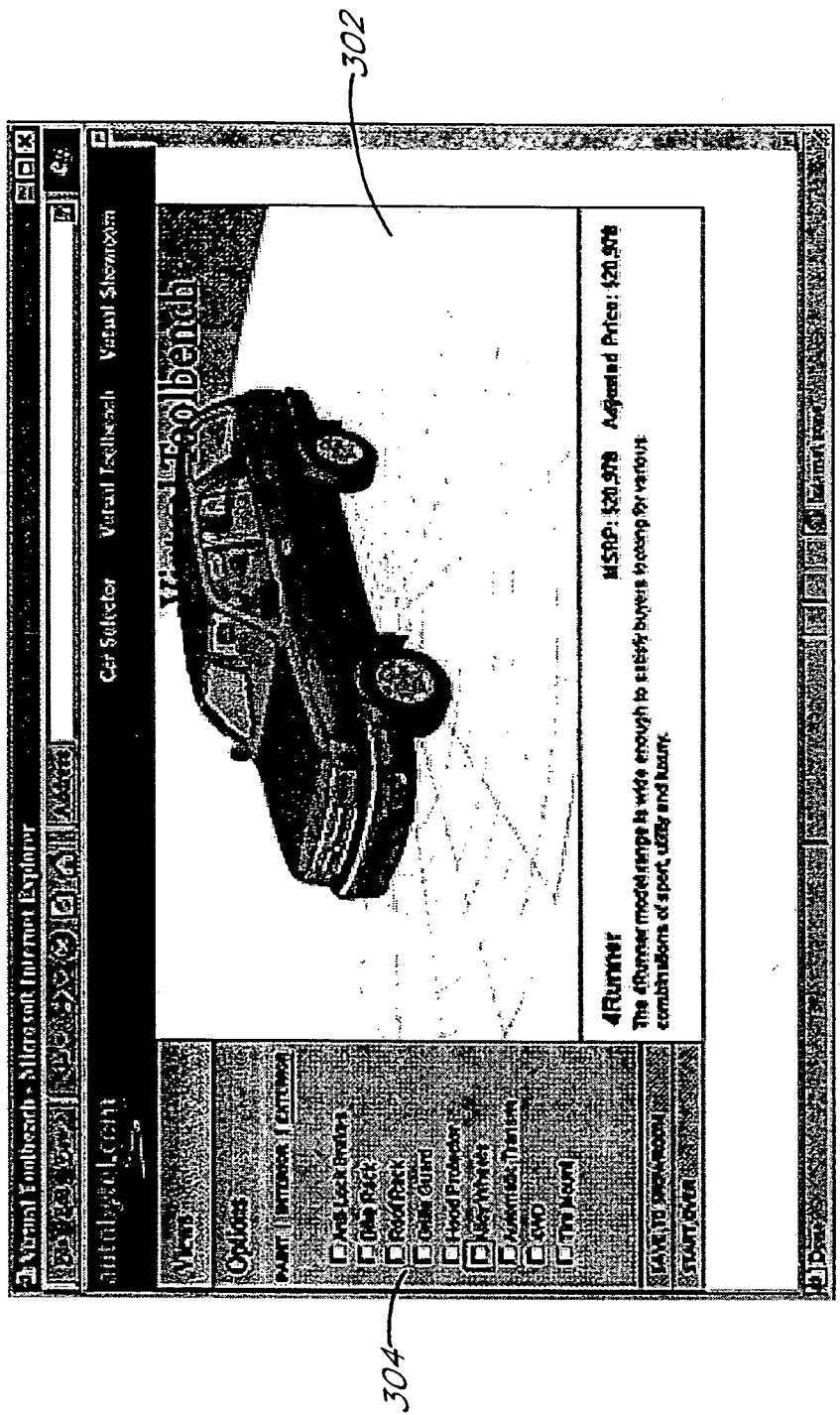
FIG. 9 is a representation of another embodiment of a web page including a list of selectable exterior options displayed in a configuration panel.

At a step 408, the potential buyer may advantageously request to view the vehicle configured according to the buyer's desires. In one embodiment, the configuration panel 304 advantageously displays a list of selectable exterior options for the displayed vehicle (FIG. 8). As an example, the selectable exterior options may be anti-lock brakes, bike rack, roof rack, grille guard, hood protector, alloy wheels, automatic transmission, four wheel drive, and tire mount. The potential buyer can request to configure the Toyota 4Runner by installing a grille guard by selecting the grille guard option in the configuration panel 304 as illustrated in FIG. 9. The product display module displays a Toyota 4Runner with the grille guard installed in the product display area 302. In one embodiment, the grille guard instantly appears on the Toyota 4Runner displayed in the product display area 302. In another embodiment, the grille guard displays gradually or "morphs" on to the Toyota 4Runner displayed in the product display area 302.

In one embodiment, the potential buyer may advantageously request the product display module to configure the Toyota 4Runner by installing and de-installing one or more of the available exterior or interior options (aftermarket products). The potential buyer may also configure the Toyota 4Runner by installing interior options such as, by way of example, a higher quality radio, a higher quality stereo, a CD player, leather seats, and floor mats. The product display module can display the appropriately configured Toyota 4Runner because of the identical scaling used during the three-dimensional model generating process. For example, the potential buyer may advantageously view the dashboard of the Toyota 4Runner containing the standard radio. The potential buyer may then configure the Toyota 4Runner with the higher quality radio and subsequently view the dashboard of the Toyota 4Runner with the higher quality radio installed. The potential buyer may alter the perspective view of the configured Toyota 4Runner in the manner previously described.

In another embodiment, the aftermarket products available for the displayed vehicle may be presented on a simulated aftermarket product carousel. This allows the potential buyer to view and compare one or more three-dimensional models of the aftermarket products before viewing the vehicle with the aftermarket product installed. In one embodiment, as illustrated in FIG. 9, the MSRP and the Adjusted Price will differ depending on the number of aftermarket products installed.

At a step 410, the potential buyer can request to view the interior of the Toyota 4Runner by selecting an aspect located in the interior of the Toyota 4Runner such as the driver, the passenger, the back seat, or the trunk. For example, the potential buyer can request to view the Toyota 4Runner from the driver seat. The product display module can display the Toyota 4Runner from the driver's perspective, as if the potential buyer is seating in the driver's seat. Moreover, the potential buyer can adjust the reference angle to view outward from the driver's seat from varying angles. The potential buyer may additionally request the product display module to rotate the view. The rotation may advantageously be about a first axis and a second axis. In one embodiment, the first axis and the second axis are the Y axis and the Z axis as illustrated in FIG. 15. The rotation may advantageously be in any direction as well as at varying speeds. Thus, the potential buyer is provided the same visual experience as if the buyer was physically seated in a real Toyota 4Runner and looking outward by moving his or her head side-to-side and up-and-down. Moreover, the potential buyer can also zoom in to view the interior of the Toyota 4Runner close up. In another embodiment, the rotation may be about the X axis, the Y axis, and the Z axis illustrated in FIG. 15.

At a step 412, the potential buyer may elect to submit a purchase request for the configured vehicle. For example, the potential buyer can elect to submit a purchase request for the white Toyota 4Runner with the grille guard as illustrated in FIG. 9. In one embodiment, the potential buyer can click on, for example, a request vehicle hypertext link, to access one or more web pages enabling the submission of a purchase request as previously described.

If the potential buyer elects not to submit a purchase request for the configured vehicle, the potential buyer may elect to save the currently configured vehicle in a personal showroom at a step 414. For example, the potential buyer can elect to save the white Toyota 4Runner with the grille guard in the buyer's personal showroom. In one embodiment, the product configuration display system 104 may advantageously save the necessary information regarding the configured Toyota 4Runner for later retrieval by the buyer. The information may be stored in the product configuration display system databases and be subsequently retrieved by the product configuration display system programs.

Figure 10:
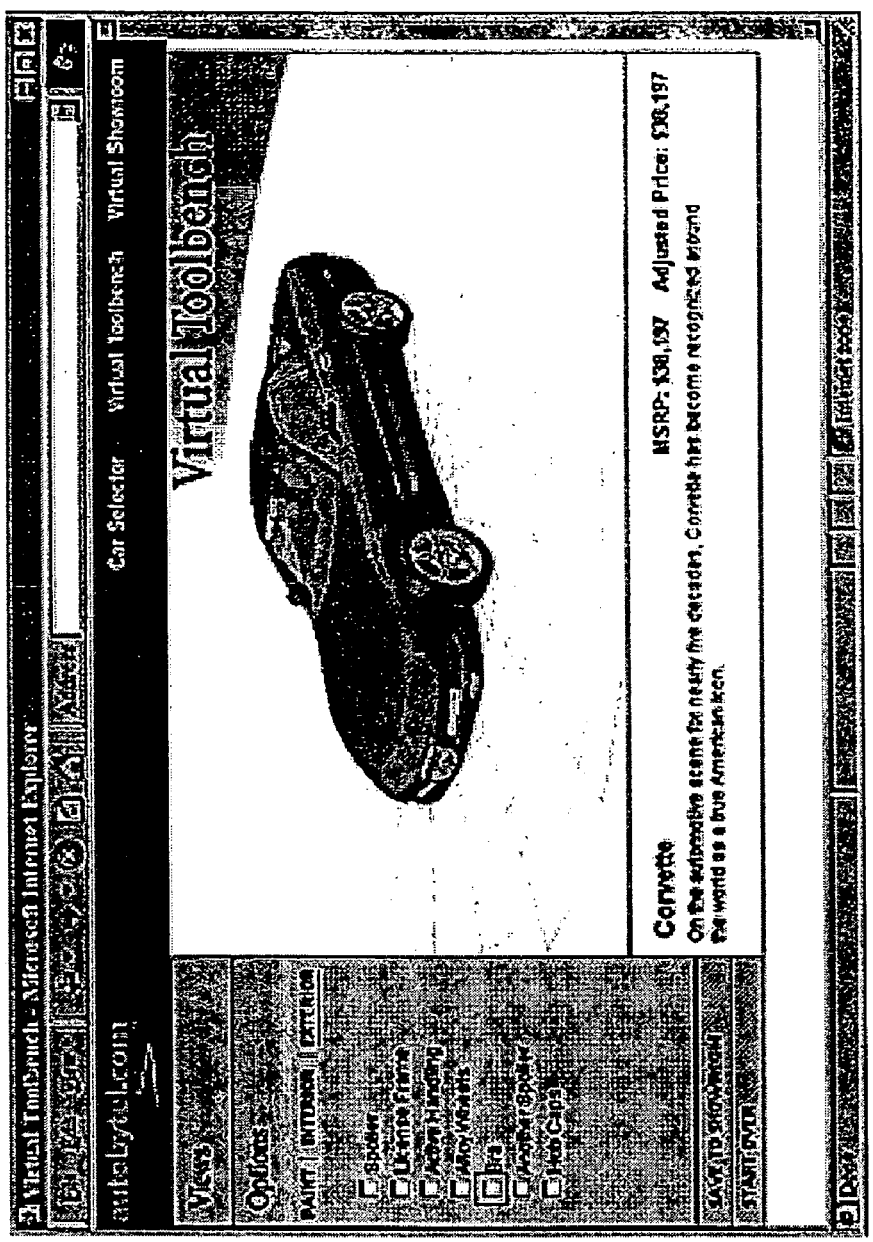
FIG. 10 is a representation of another embodiment of a web page including a perspective view of a vehicle displayed in a product display area.

At a step 416, the potential buyer may elect to configure another vehicle. For example, the potential buyer may want to configure a Corvette. In one embodiment, the potential buyer can select the start over option displayed in the configuration panel 304 (FIG. 9). The product display module may advantageously display the first web page as illustrated in FIG. 2. The potential buyer can then select the Corvette vehicle selection box 202 to request the product display module to display a perspective view of the Corvette as generally illustrated in FIG. 10. The potential buyer may then proceed with configuring the Corvette in a manner substantially similar to the manner previously described for the Toyota 4Runner.

In one embodiment, the potential buyer may advantageously repeat the process described above to configure as many vehicles as desired. Furthermore, those of ordinary skill in the art will realize that the procedural steps outlined in the flow chart (FIG. 4) may be substantially altered without detracting from the essential features of the invention.

Figure 11:
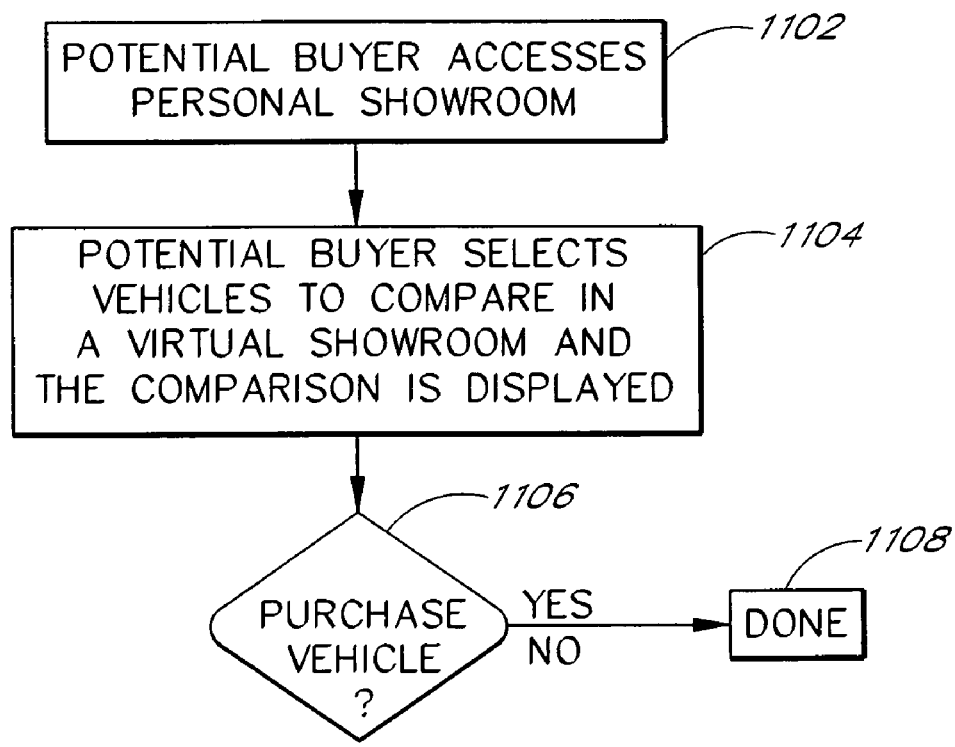
FIG. 11 is a flow chart generally illustrating a vehicle comparison process according to one embodiment of the invention.
Figure 12:
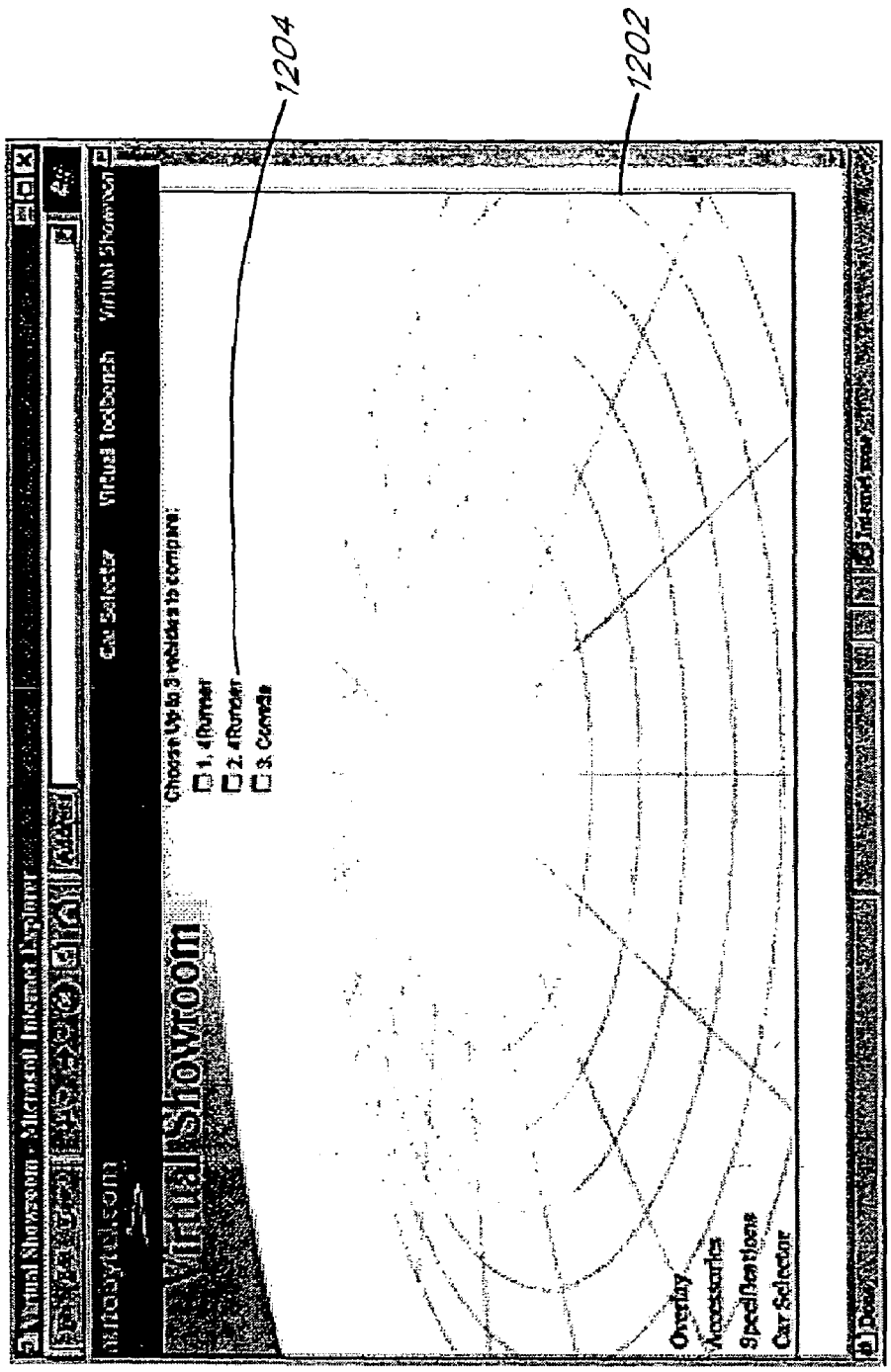
FIG. 12 is a representation of one embodiment of a web page including a virtual showroom.

FIG. 11 is a flow chart generally illustrating a vehicle comparison process according to one embodiment of the invention. At a step 1102, the potential buyer accesses the buyer's personal showroom. In one embodiment, the personal showroom is the personal showroom created by the potential buyer in the save the currently configured vehicle in a personal showroom step 414 (FIG. 4). For example, the potential buyer may have configured two (2) Toyota 4Runners and a Corvette, and saved these configured vehicles in a personal showroom. FIG. 12 generally illustrates a first web page of the potential buyer's personal showroom comprising a virtual showroom 1202 including a selectable list of previously configured vehicles 1204.

In one embodiment, the virtual showroom 1202 initially does not display a perspective view of a previously configured vehicle. The potential buyer clicks on an entry in the selectable list of previously configured vehicles 1204 to request the product display module to retrieve the previously stored information regarding the selected vehicle and to display a product perspective view of the selected vehicle in the virtual showroom 1202. For example, as illustrated in FIG. 13, the potential buyer can select the first 4Runner to request the product display module to display the previously configured 4Runner.

The product display module displays the 4Runner at a default reference angle and pitched at a default angle. Moreover, the 4Runner may advantageously be rotating substantially about its central axis providing multiple perspective views of the 4Runner. In one embodiment, the potential buyer may advantageously alter the product presentation by performing the operations previously described. The virtual showroom 1202 additionally displays vehicle information such as an adjusted price of the configured vehicle, a list of aftermarket product accessories installed, and a list of vehicle specifications.

In one embodiment, the potential buyer may advantageously further customize the configured vehicle by clicking on a customize link 1302 using a pointing device such as a mouse, or the like. The product display module may then present on the buyer terminal a web page from which the potential buyer can further customize the vehicle. Such as web page suitable for use in one embodiment is generally illustrated in FIG. 3. The potential buyer may then proceed to configure the vehicle as previously described.

Figure 13:
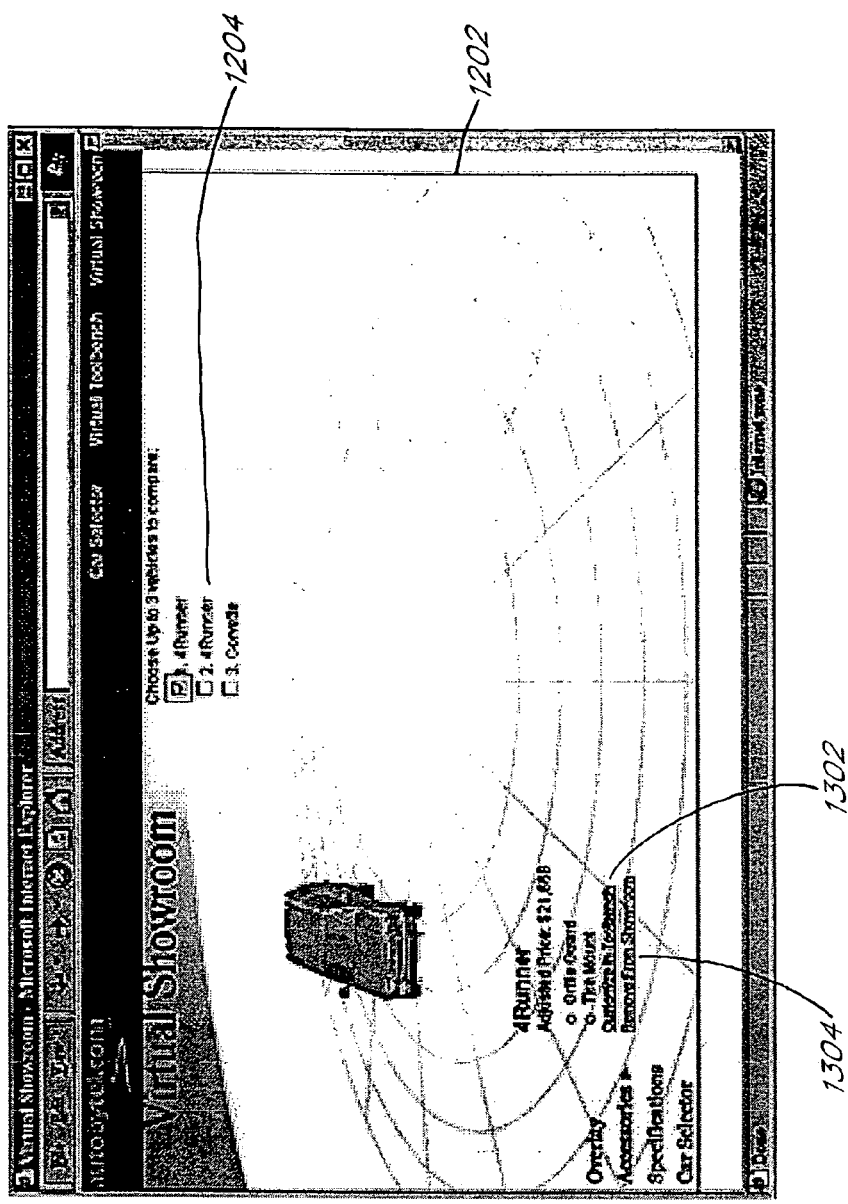
FIG. 13 is a representation of another embodiment of a web page including a virtual showroom.

In one embodiment, the potential buyer may advantageously remove a vehicle displayed in the virtual showroom 1202 from the buyer's personal showroom by clicking on the remove from showroom option 1304 (FIG. 13). Moreover, the potential buyer may request the product display module to terminate the display of a vehicle in the virtual showroom 1202 by clicking on an already selected entry in the selectable list of previously configured vehicles 1204. The product display module then terminates the product presentation of the selected vehicle in the virtual showroom 1202.

Figure 14:
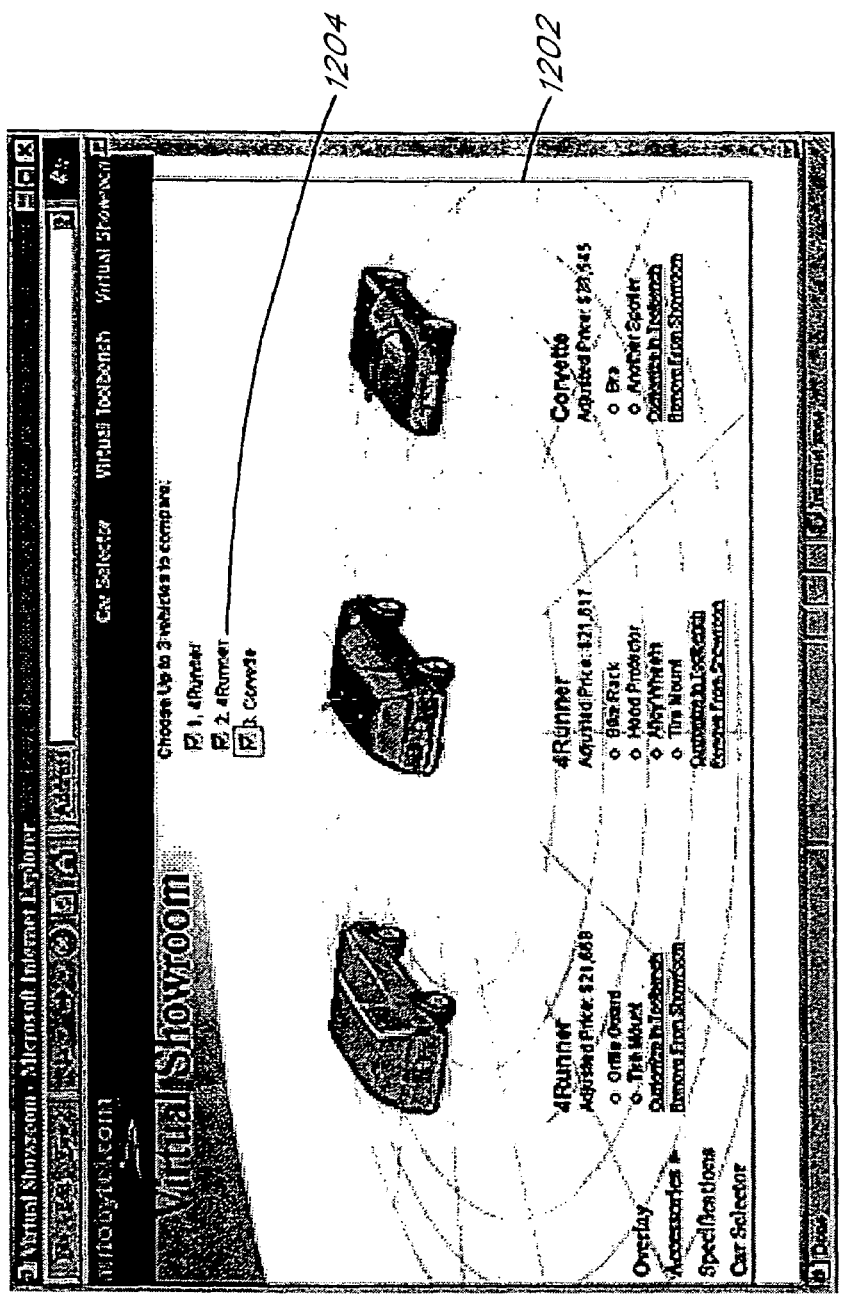
FIG. 14 is a representation of yet another embodiment of a web page including a virtual showroom.

At a step 1104, the potential buyer may select up to three vehicles to display in the virtual showroom 1202 in order to perform a side-by-side vehicle comparison. For example, the potential buyer can request the product display module to display the second 4Runner and the Corvette in the virtual showroom 1202. FIG. 14 generally illustrates a web page illustrating product perspective views of the first 4Runner, second 4Runner, and the Corvette as requested by the potential buyer. In one embodiment, the vehicles are displayed in synchronized rotation at a default reference angle and pitched at a default angle. The potential buyer may advantageously alter the product presentation of one, two, or all three vehicles substantially in the manner previously described. In another embodiment, the potential buyer may advantageously select a different number of previously configured vehicles to display in the virtual showroom 1202.

In yet another embodiment, the potential buyer may advantageously perform a side-by-side vehicle component comparison. The potential buyer may request the product display module to display a perspective view of specific a segment or part of the vehicles. For example, the potential buyer can request to perform a side-by-side comparison of a passenger compartment of the first 4Runner and a passenger compartment of the Corvette. The product display module can then display a perspective view of the respective passenger compartments. The potential buyer can advantageously alter the perspective view of one or both product presentations by performing the operations previously described.

In one embodiment, the potential buyer may advantageously request the product display module to display two (2) vehicles superimposed in the virtual showroom 1202. The product display module can display the respective three-dimensional models of the selected vehicles superimposed upon each other. For example, one vehicle may be colored or shaded lighter than the other vehicle in order to distinguish the one vehicle from the other. Alternatively, both vehicles may be represented in light phantom. The superimposed vehicles may likewise be presented in an initial perspective view. The potential buyer may then advantageously alter the perspective view by performing the operations previously described. In another embodiment, the potential buyer may view more than two (2) vehicles superimposed upon each other. In yet another embodiment, the potential buyer may view specific parts of selected vehicles, such as, by way of example, the trunk, the passenger compartment, or the engine compartment, superimposed upon each other. Thus, the potential buyer can fully compare all aspects of the configured vehicles before selecting a vehicle to purchase.

In a step 1106, the potential buyer may advantageously compare the configured vehicles in the buyer's personal showroom, and may elect to submit a purchase request for a previously configured vehicle. Thus, the potential buyer can fully and intelligently compare all aspects of the configured vehicles before selecting a vehicle to purchase.

In another embodiment, the potential buyer may advantageously create a personal vehicle brochure. For example, the potential buyer would be able to configure a desired vehicle as previously described. The potential buyer may then be presented with an option to create a vehicle brochure for the recently configured vehicle. Each page in the brochure may advantageously be a web page which, when selected, would expand or, conversely, contract. In one embodiment, selecting the option will provide the potential buyer access to a web page containing a default template for the creation of the vehicle brochure. The default template may include one or more pre-selected perspective views of the configured vehicle in predetermined locations. Moreover, there may be standard text, including product specific information such as the vehicle options and specifications, which is included in the vehicle brochure. In another embodiment, the potential buyer may be provided the option of customizing the template to include different perspective views of the configured product, along with personally authored text, in the vehicle brochure.

In one embodiment, the potential buyer may advantageously print out the personal vehicle brochures on a suitable color printer. Alternatively, the potential buyer may order through the web page a glossy brochure substantially similar to the brochures currently available at dealerships with the exception that the brochure contains the potential buyer's selected vehicle configurations. For example, the product configuration display system 104 may advantageously create the glossy brochure by, for example, printing the brochure on a high quality printer.

In one embodiment, a personal vehicle catalogue may advantageously include one or more vehicle brochures. The personal vehicle catalogue may be opened to add newly created vehicle brochures or deleted existing vehicle brochures.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A product configuration display system comprising:
a data center having a microprocessor operably connected to a storage media, said data center configured to be networked with at least a buyer terminal, said data center configured to receive at least one request to change a product presentation from said buyer terminal;
at least one three-dimensional representation of a first product stored in said storage media, said at least one three-dimensional representation of said first product capable of illustrating multiple perspective views of said first product by rotating said three-dimensional representation of the product; and
a product display module operably connected to said storage media and configured to execute in said data center, said product display module including a definition of a product display screen accessible by said buyer terminal, said product display module configured to receive a request to change a product presentation through said product display screen, said request comprising a user-selected alteration of an physical product exterior/interior option, said product display module configured to display the changed product presentation comprising said user-selected alteration of a physical product exterior/interior option in said product display screen by modifying said definition of the product display screen wherein the user-selected alteration of a physical product exterior/interior comprises a change in the exterior and/or interior three-dimensional shape of the product presentation.

2. The system as defined in claim 1, wherein said at least one three-dimensional representation of said first product is a three-dimensional model of said first product.

3. The system as defined in claim 1, wherein said at least one three-dimensional representation of said first product is at least one three-dimensional photograph of said first product.

4. The system as defined in claim 1, wherein said definition of said product display screen includes a manufacturer suggested retail price and an adjusted price.

5. The system as defined in claim 1, wherein said rotating includes rotating about a first axis then rotating about a second axis.

6. The system as defined in claim 5, wherein said first axis is a substantially horizontal axis and said second axis is a substantially vertical axis.

7. The system as defined in claim 5, wherein said first axis is a substantially vertical axis and said second axis is a substantially horizontal axis.

8. The system as defined in claim 1, wherein said rotating is continuous.

9. The system as defined in claim 1, wherein said rotating is about a point within the interior of said three-dimensional representation of the product.

10. The system as defined in claim 1, wherein said rotating is about a point on the exterior of said three-dimensional representation of the product.

11. The system as defined in claim 1, wherein said three-dimensional representation can be rotated to illustrate a constant source of light.

12. The system as defined in claim 1, wherein said request to change said product presentation includes a request to change a product perspective view.

13. The system as defined in claim 12, wherein said request to change said product perspective view includes changing a reference angle.

14. The system as defined in claim 12, wherein said request to change said product perspective view includes changing said rotating to a different direction.

15. The system as defined in claim 1, wherein said request to change said product presentation includes a request to change a product configuration.

16. The system as defined in claim 1, wherein said request to change said product presentation includes a request to change a product color.

17. The system as defined in claim 1, wherein the product is a vehicle and wherein the presentation is a three dimensional model of the vehicle and shows the physical shape changes that the user would see in the showroom when a selected option is actually included in the vehicle being viewed.

18. A method of presenting at least one product configuration over a network, comprising the acts of:
providing a data center having a microprocessor operably connected to a storage media, said data center configured to be networked with at least a buyer terminal, said data center configured to receive at least one request to change a product presentation from said buyer terminal, said request comprising user-selected alterations of physical product exterior/interior options;
providing at least one three-dimensional representation of a first product stored in said storage media, said at least one three-dimensional representation of said first product capable of illustrating multiple perspective views of said first product by rotating said three-dimensional representation of the product;
providing a definition of a product display screen accessible by a buyer terminal, said definition of said product display screen includes a product presentation, wherein said product presentation includes at least one perspective view of said first product;
receiving a request to change said product presentation from a buyer terminal, said request comprising user-selected alterations of physical product exterior/interior options; and
modifying said definition of said product display screen according to said request to change said product presentation comprising said user-selected alterations of physical product exterior/interior options including a change in the exterior and/or interior three-dimensional shape of the product presentation.

19. The method as defined in claim 18, wherein said at least one three-dimensional representation of said first product is a three-dimensional model of said first product.

20. The method as defined in claim 18, wherein said at least one three-dimensional representation of said first product is at least one three-dimensional photograph of said first product.

21. The method as defined in claim 18, wherein said definition of said product display screen includes a manufacturer suggested retail price and an adjusted price.

22. The method as defined in claim 18, wherein said rotating includes rotating about a first axis then rotating about a second axis.

23. The method as defined in claim 22, wherein said first axis is a substantially horizontal axis and said second axis is a substantially vertical axis.

24. The method as defined in claim 22, wherein said first axis is a substantially vertical axis and said second axis is a substantially horizontal axis.

25. The method as defined in claim 18, wherein said rotating is continuous.

26. The method as defined in claim 18, wherein said rotating is about a point within the interior of said three-dimensional representation of the product.

27. The method as defined in claim 18, wherein said rotating is about a point on the exterior of said three-dimensional representation of the product.

28. The method as defined in claim 18, wherein said three-dimensional representation can be rotated to illustrate a constant source of light.

29. The method as defined in claim 18, wherein said request to change said product presentation includes a request to change a product perspective view.

30. The method as defined in claim 29, wherein said request to change said product perspective view includes changing a reference angle.

31. The method as defined in claim 29, wherein said request to change said product perspective view includes changing said rotating to a different direction.

32. The method as defined in claim 18, wherein said request to change said product presentation includes a request to change a product configuration.

33. The method as defined in claim 18, wherein said request to change said product presentation includes a request to change a product color.

34. The method as defined in claim 18, further comprising the acts of:
providing at least one three-dimensional representation of a second product stored in said storage media;
receiving a request to change said product presentation by combining said at least one representation of said second product with said at least one representation of said first product.

35. The method as defined in claim 18, further comprising the acts of:
providing at least one three-dimensional representation of a second product stored in said storage media; and receiving a request to change said product presentation by removing substantially said at least one representation of said second product from said at least one representation of said first product.

36. The method as defined in claim 18, further comprising the acts of:
   providing at least one three-dimensional representation of a second product stored in said storage media; and
   receiving a request to change said product presentation by replacing substantially said second product contained within said at least one representation of said first product with said at least one representation of said second product.

37. The method as defined in claim 18, further comprising the acts of:
   providing at least one three-dimensional representation of a second product stored in said storage media; and
   receiving a request to change said product presentation by superimposing said at least one representation of said first product and said at least one representation of said second product.

38. A product configuration display system comprising:
   a data center having a microprocessor operably connected to a storage media, said data center configured to be networked with at least a buyer terminal, said data center configured to receive at least one request to change a product presentation from said buyer terminal;
   at least one three-dimensional representation of a first product stored in said storage media, said at least one three-dimensional representation of said first product capable of illustrating multiple perspective views of said first product by rotating said three-dimensional representation of the product; and
   a product display module operably connected to said storage media and configured to execute in said data center, wherein said product display module includes a definition of a product display screen accessible by said buyer terminal, wherein said product display module is configured to receive one or more requests to change a product presentation of said first product and said second product through said product display screen wherein said request comprises user-selected alterations of physical product exterior/interior options to create modified product presentations of said first and second products, wherein said first and second modified product presentations are stored as first and second stored product presentations, and wherein said product display module is configured to retrieve and simultaneously display said first and second stored product presentations comprising said user-selected alterations of physical product exterior/interior options in said product display screen by modifying said definition of the product display screen wherein the user-selected alteration of physical product exterior/interior options comprises a change in the exterior and/or interior three-dimensional shape of one of the product presentations.

39. The system of claim 38, wherein said first product and said second product are the same product, and wherein said first and second stored product presentations have different user-selected alterations of physical product exterior/interior options.

\* \* \* \* \*